United States Patent [19]

Astegiano et al.

[11] 4,295,007
[45] Oct. 13, 1981

[54] LINE IDENTIFIER FOR SWITCHBOARDS

[75] Inventors: Luciano Astegiano; Wouter M. D. van Veen, both of Turin, Italy

[73] Assignee: CSELT-Centro Studi e Laboratori Telecomunicazioni S.p.A., Turin, Italy

[21] Appl. No.: 120,545

[22] Filed: Feb. 11, 1980

Related U.S. Application Data

[63] Continuation-in-part of Ser. No. 953,163, Oct. 20, 1978, Pat. No. 4,252,998.

[30] Foreign Application Priority Data

Oct. 21, 1977 [IT] Italy ................................ 69356 A/77

[51] Int. Cl.$^3$ ...................... H04M 5/04; H04M 15/00
[52] U.S. Cl. .................................. 179/7 R; 179/8 A; 179/18 FH; 179/27 DB; 179/91 R
[58] Field of Search ..................... 179/8 R, 8 A, 9–12, 179/7 R, 18 FH, 27 DB, 91 R, 175.2 R

[56] References Cited

U.S. PATENT DOCUMENTS

| 3,828,140 | 8/1974 | Blane et al. | 170/18 FH |
| 3,864,526 | 2/1975 | Pirnie, Jr. et al. | 179/27 DB |
| 3,890,473 | 6/1975 | Warman et al. | 179/27 DB |
| 4,118,790 | 10/1978 | Cockett et al. | 179/7 R |
| 4,146,929 | 3/1979 | Troughton et al. | 179/7 R |

OTHER PUBLICATIONS

"SP-1 Tops: Electronic Switching Improves Operator Services", *Telesis*, vol. 3, #5, pp. 143–150, Jan./Feb. 1974, Author: E. Bierman.

*Primary Examiner*—Gerald L. Brigance
*Attorney, Agent, or Firm*—Karl F. Ross

[57] ABSTRACT

A line identifier at a telecommunication switchboard comprises a matrix of magnetic-induction elements serving as current sensors for detecting a request for establishing a connection between a selected incoming line and a selected outgoing line. The sensors are connected to a multiplexer for providing samples in a time-division mode to a logic circuit controlled by a pair of microprocessors and addressing a read/write memory for storing information on the states of the sensors. A microprocessor, upon receiving from a sensor an identification request for a selected outgoing line, such request implicitly coding a selected input line, activates a relay which closes a circuit enabling the energization of a sensor whose output signal to the logic network identifies the outgoing line selected via the switchboard for connection to the prior-identified incoming lines. Upon successful identification of a selected incoming line and at least one selected outgoing line, the microprocessors emit energization signals to a pair of relays which thereupon break the circuits energizing the sensors and establish a link between the selected incoming line and the selected outgoing line. The logic network is connected via its control microprocessors to a computer for communicating thereto the identities of interconnected lines. The logic network with its associated multiplexer and microprocessors may be duplicated for cross-checking operations.

17 Claims, 17 Drawing Figures

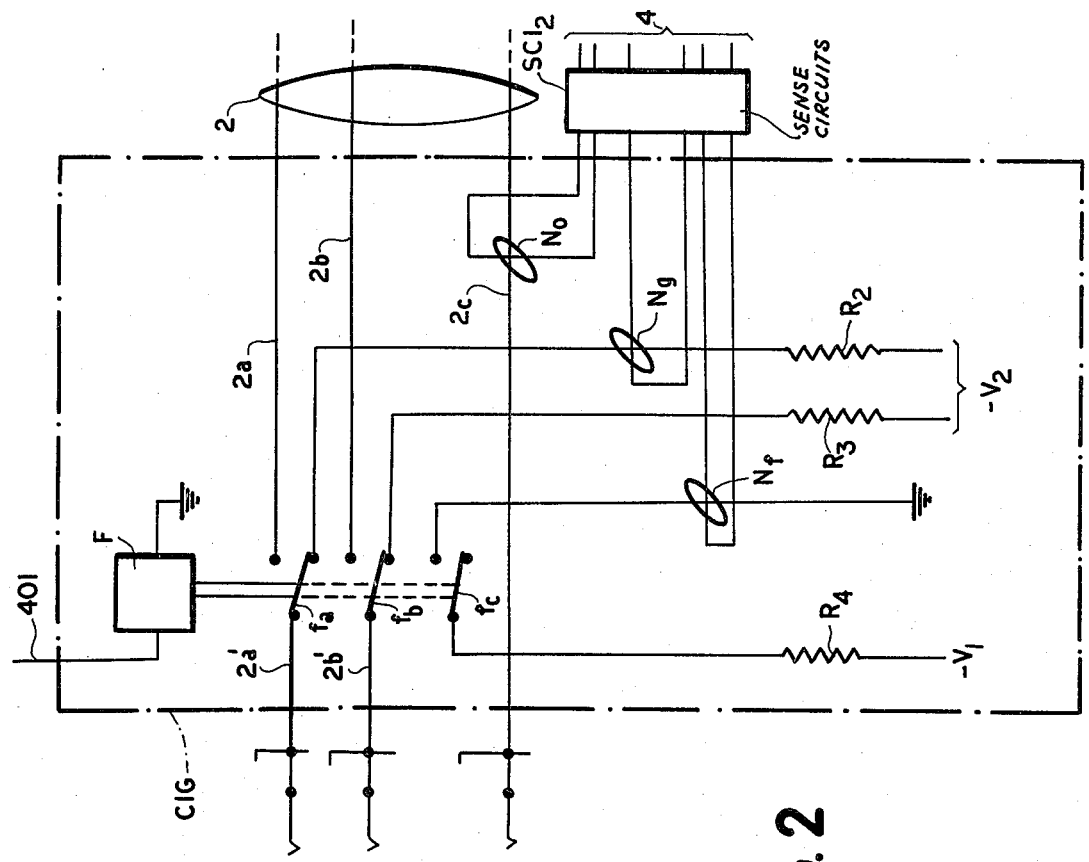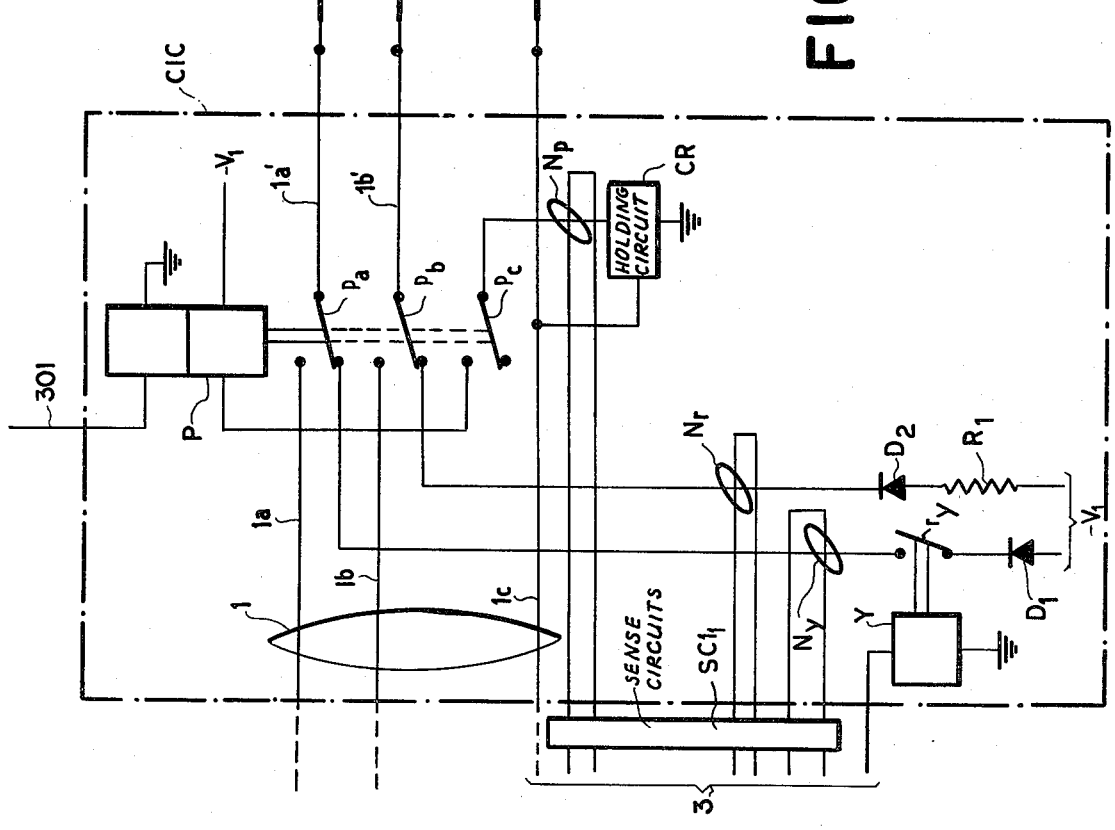
FIG.2

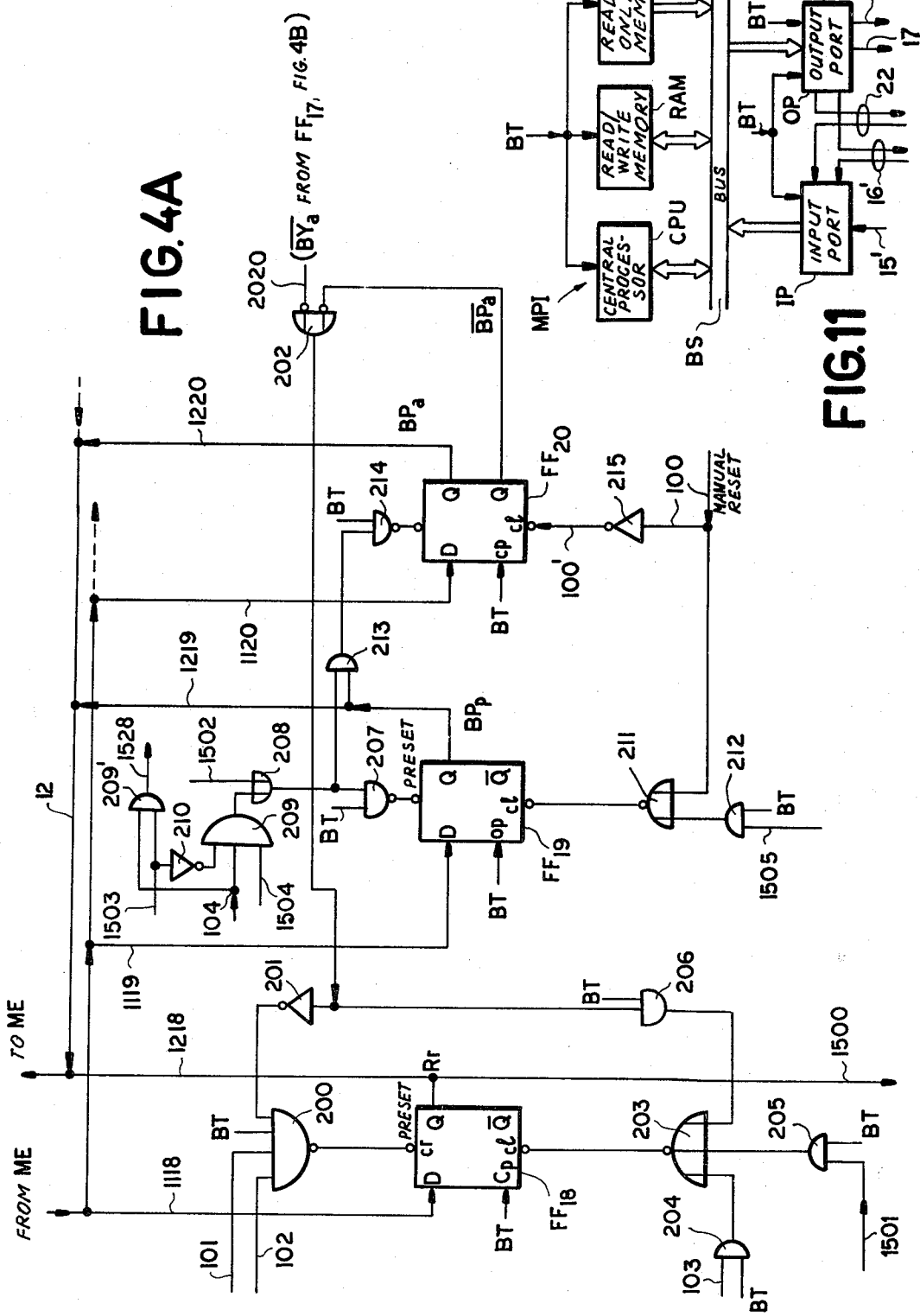

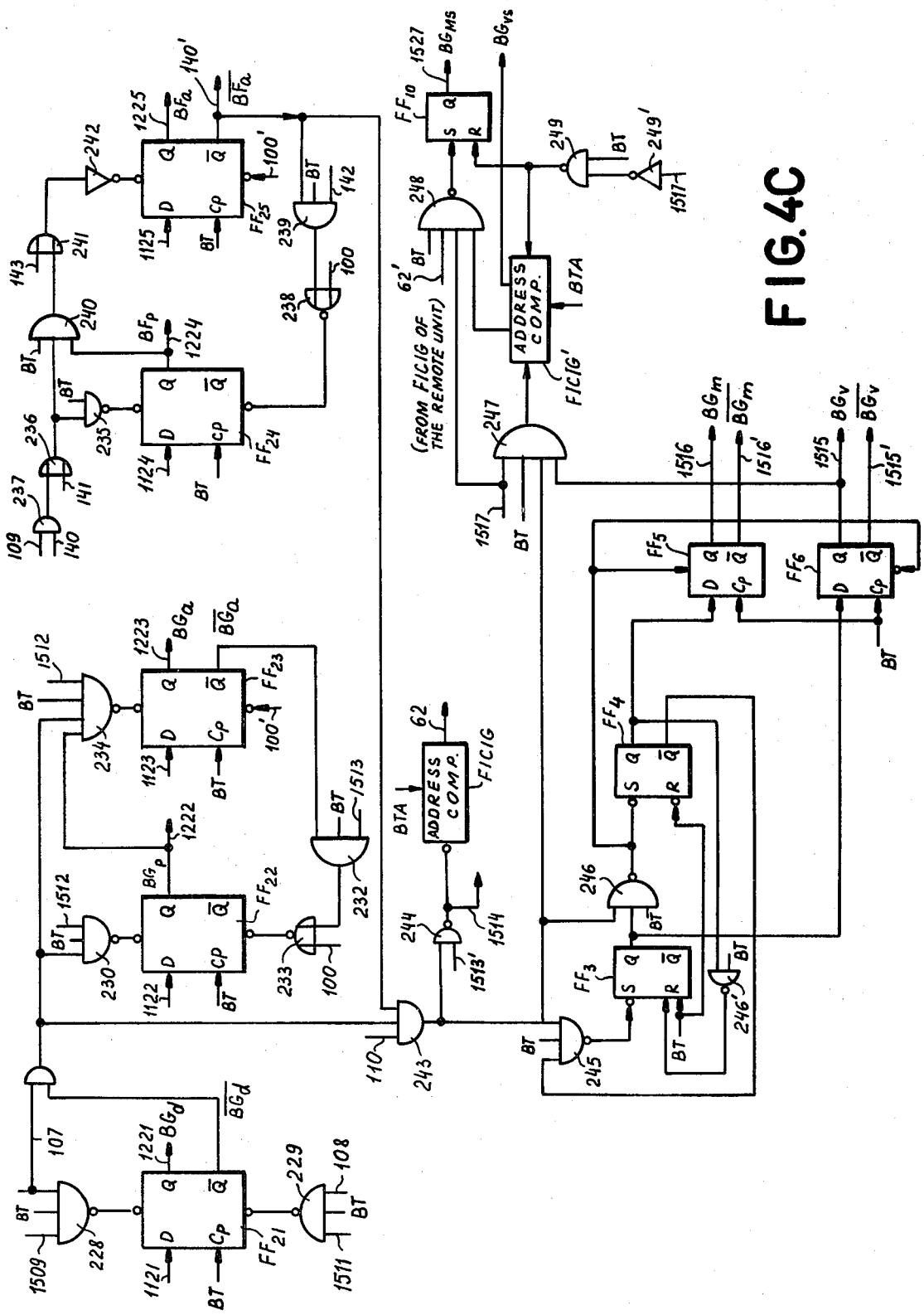

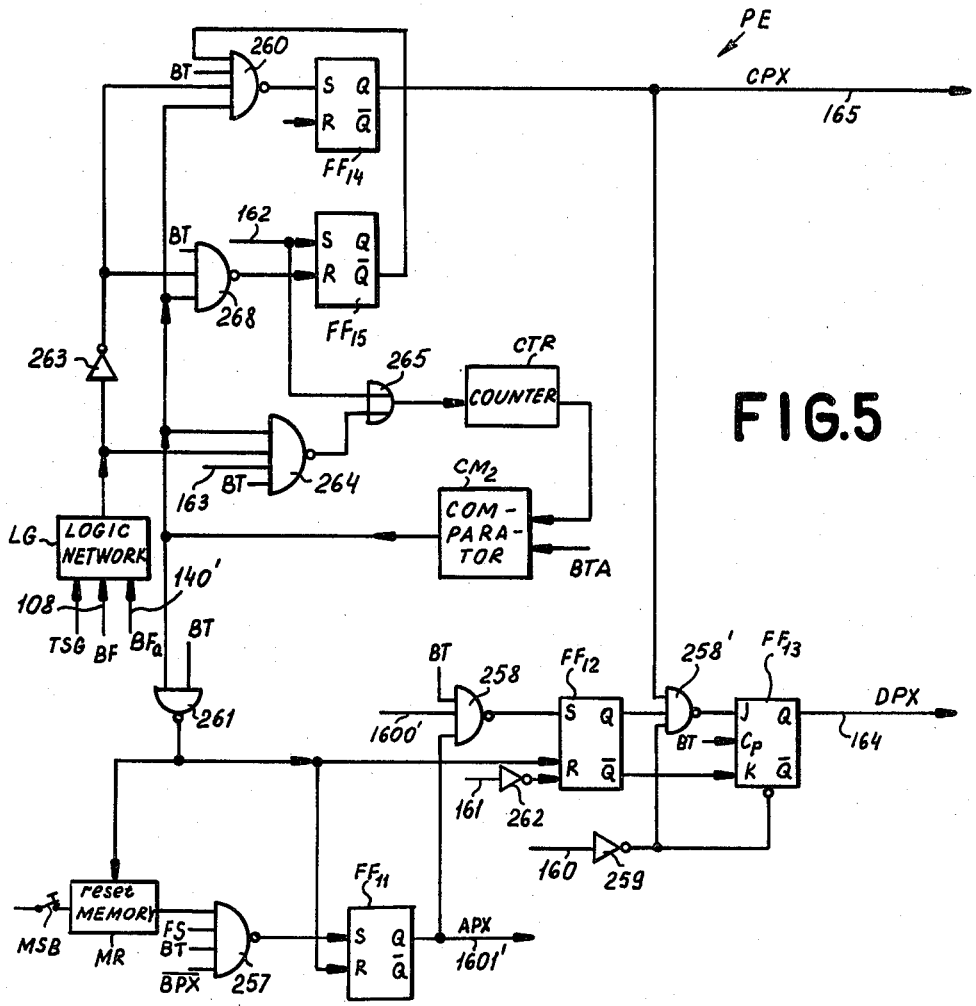

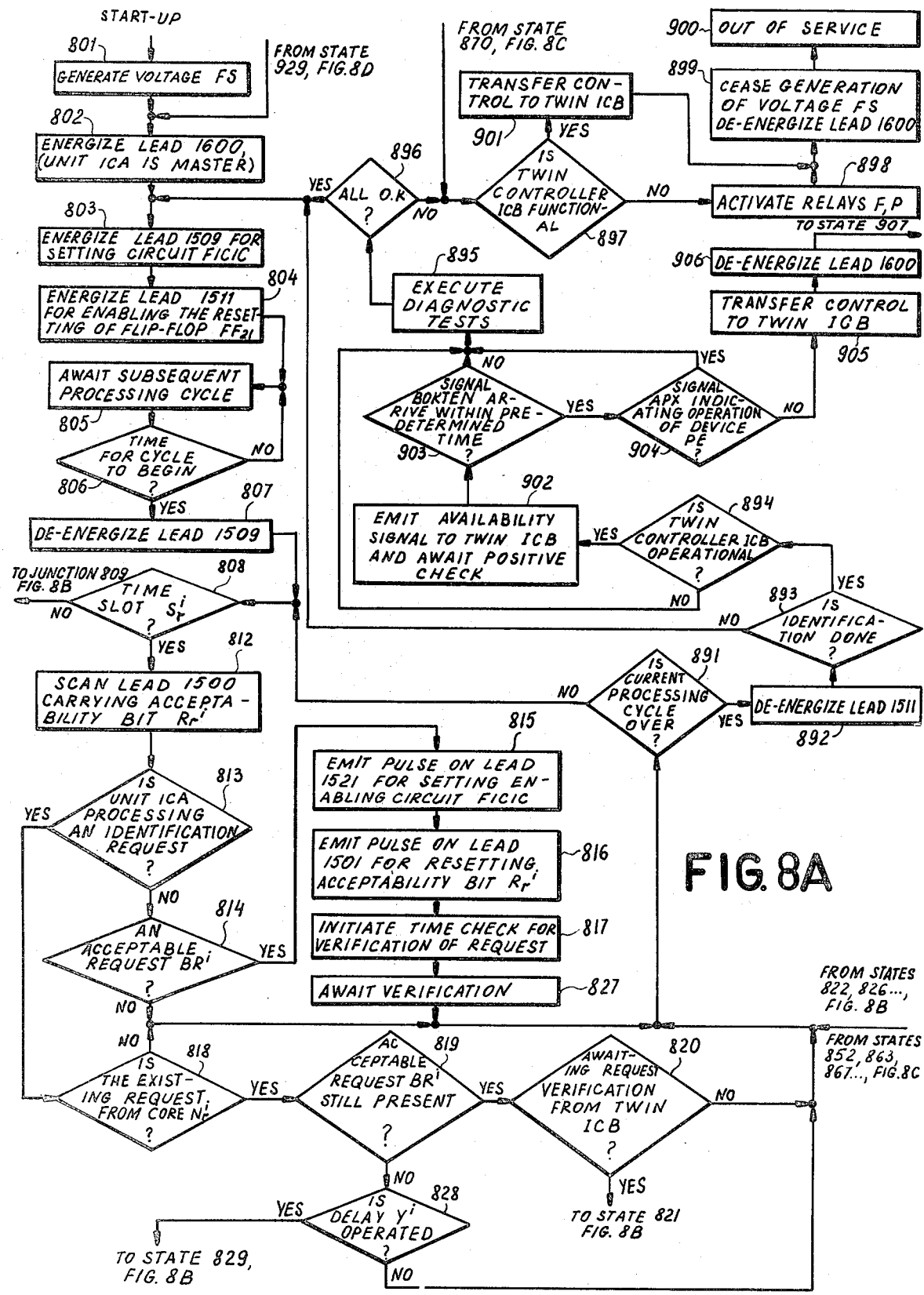

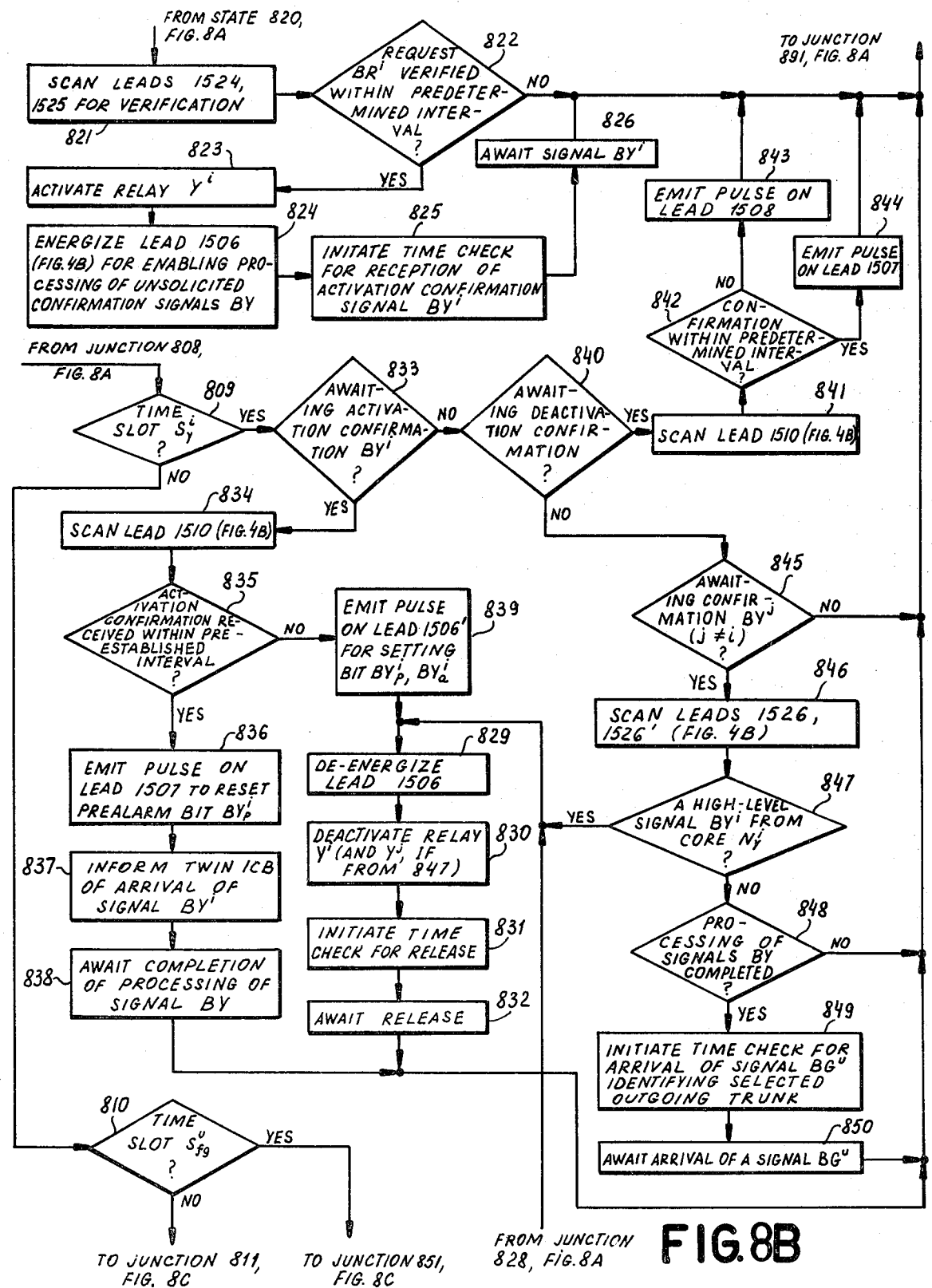

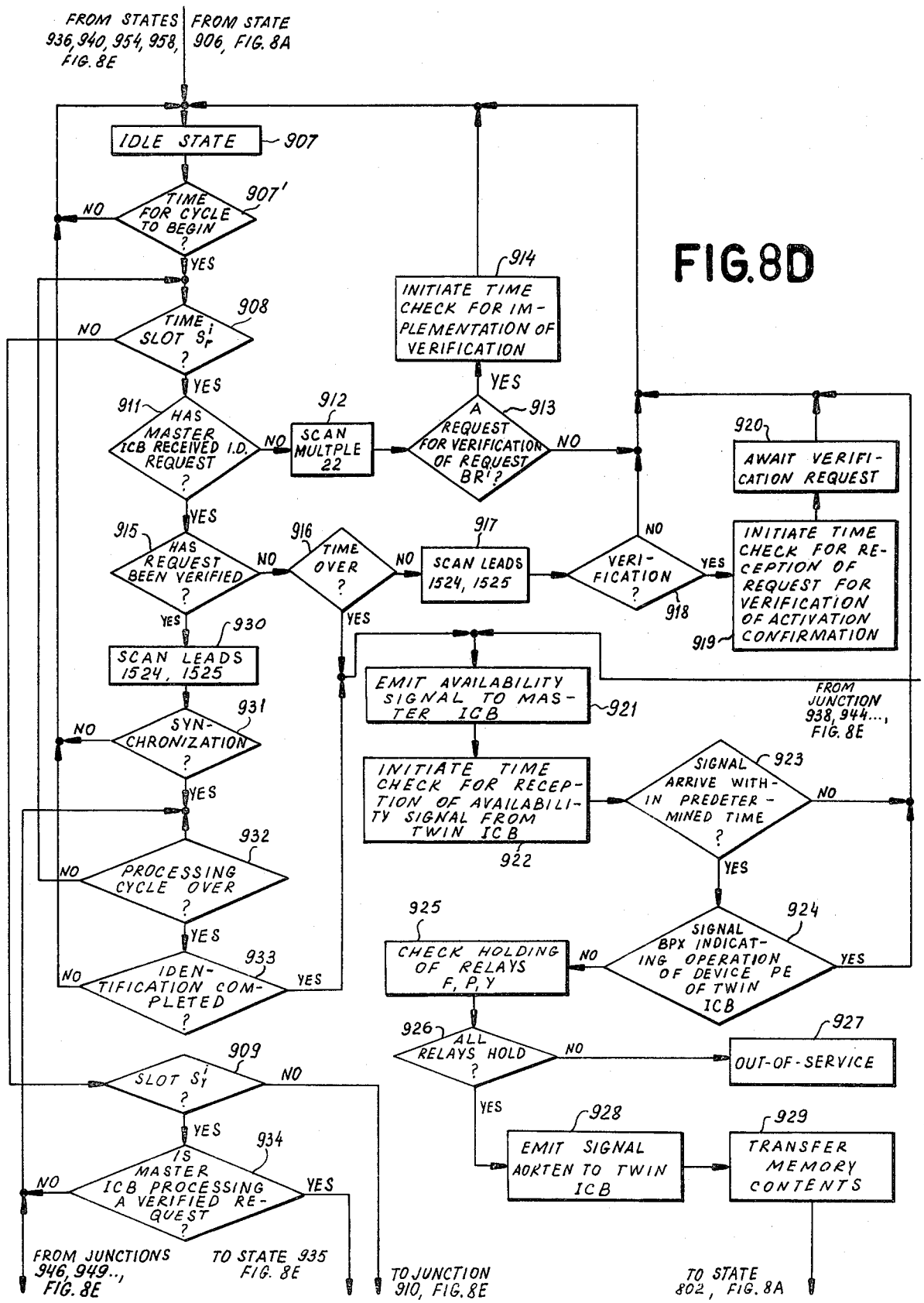

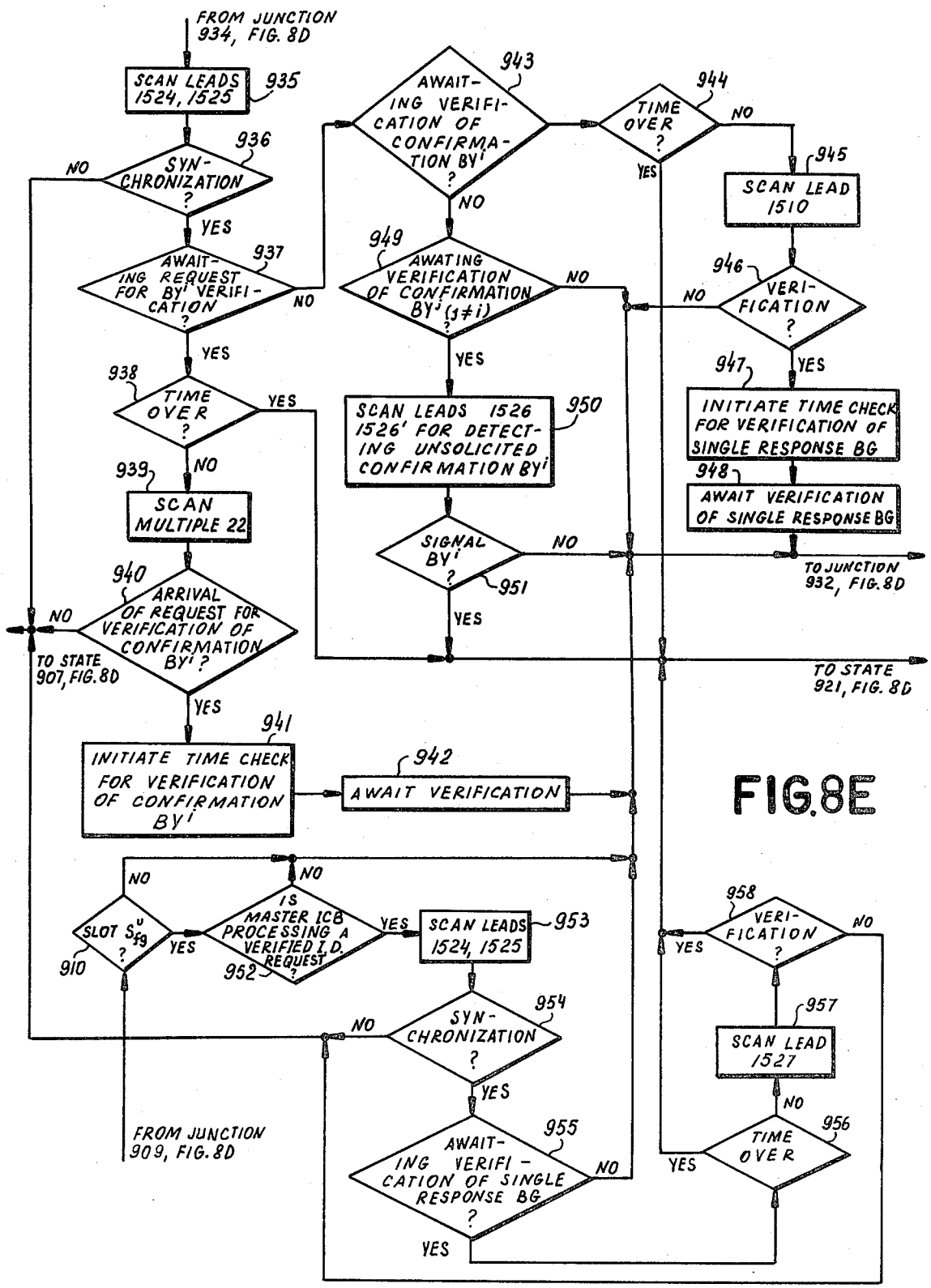

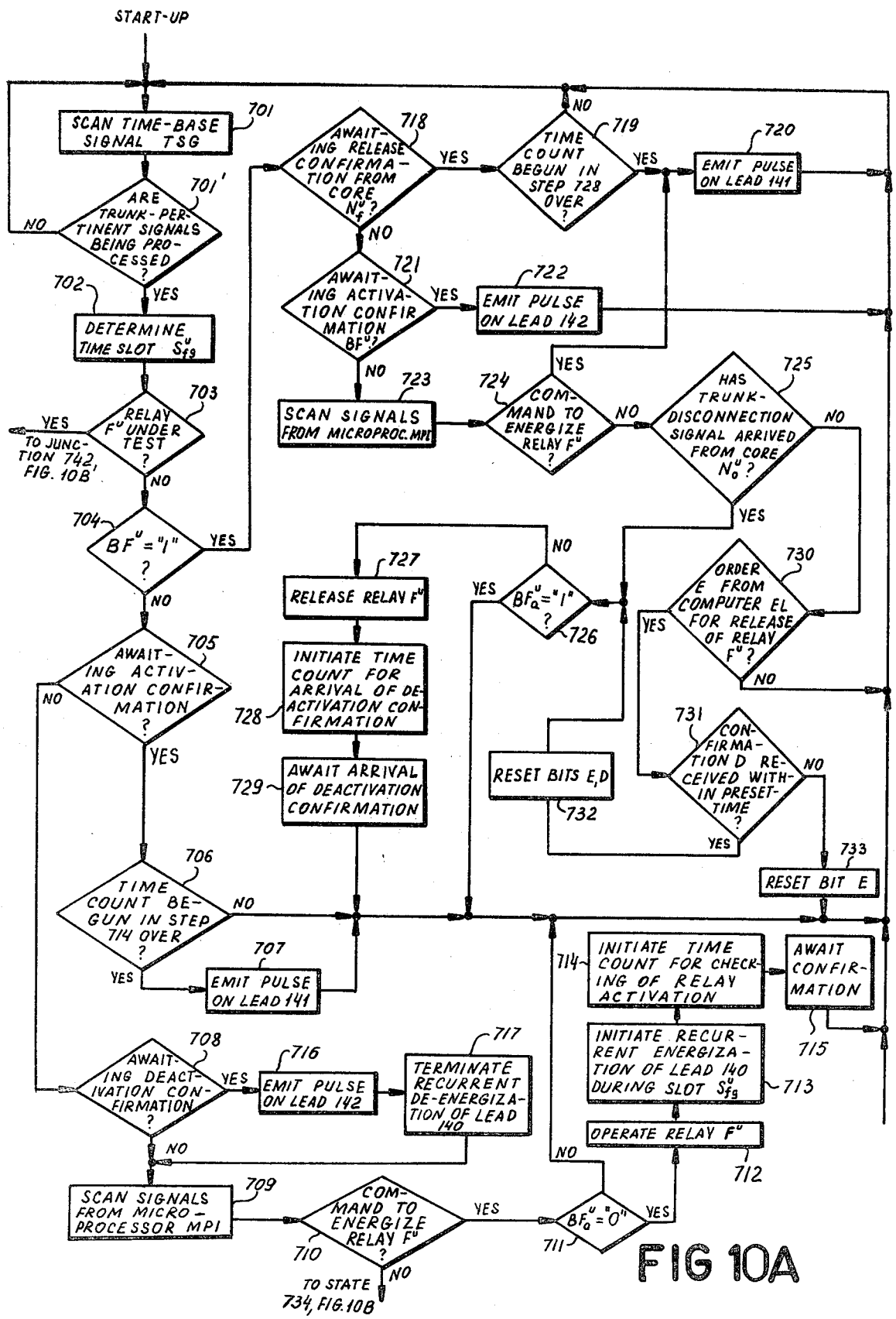

LINE IDENTIFIER FOR SWITCHBOARDS

CROSS-REFERENCE TO A RELATED APPLICATION

The present application is a continuation-in-part of our copending U.S. patent application Ser. No. 953,163 filed Oct. 20, 1978 now U.S. Pat. No. 4,252,998.

FIELD OF THE INVENTION

Our present invention relates to a line identifier at manually operated switchboards.

BACKGROUND OF THE INVENTION

In traffic supervision and accounting of operator-assisted calls, it is necessary to collect and correlate data from switching nodes at different locations, for example, at a switchboard and at other points of an exchange. In particular, it is advantageous for accounting purposes to know the identity of a plug connection used for establishing a call, the identity of the switchboard and the identity of the trunk engaged in the implemented call connection (datum from the exchange).

Devices for detecting and correlating information coming from different points of a call connection, particularly information relating to the identity of a calling subscriber and to the identity of a called subscribed, are known in the telephone switching art. Any stage marker of an indirect-control exchange may serve as an illustration.

However, such devices discover only the end station of an imminent connection which is then set up upon the finding of a free path; they are useless in the case of a manually implemented connection such as that effectuated at a switchboard. Furthermore, conventional line identifiers employed at automatic exchanger cannot operate if the same line is used by many connections simultaneously, i.e. in the event of a conference among a plurality of operators or of a connection transfer from one operator to another.

OBJECT OF THE INVENTION

The object of our present invention is to provide a line identifier for switchboards which can handle plural identifications necessitated by call transfers and by conference calls, e.g. among operators.

SUMMARY OF THE INVENTION

In a telecommunications system including a switchboard with a multiplicity of incoming lines and a multiplicity of outgoing lines (e.g. trunks), a line identifier for monitoring switchboard activity and for establishing a telecommunication link between a selected incoming line and a selected outgoing line (referred to hereinafter as a trunk) in response to manual operations at the switchboard comprises, according to our present invention, a first detector and a second detector each connected to the switchboard for generating a first signal coding the identity of a selected incoming line and requesting the identification of a concomitantly selected trunk and a second signal coding the identity of a selected trunk, respectively. Switches are coupled to the incoming lines and to the trunks for implementing a connection upon the successful recognition of a selected incoming line and a selected trunk by the line identifier. A controller is linked to the first detector for decoding identification requests therefrom, to the second detector for enabling same to emit a trunk-identifying signal upon the reception by the controller of a request signal from the first detector, and to the switches for selectively actuating same to connect a selected incoming line to a concomitantly selected trunk upon the decoding by the controller of a signal from the second detector indicating such trunk.

According to another feature of our present invention, the first detector includes a matrix of current sensors each operationally coupled with a respective first circuit portion in turn associated with a respective incoming line, the sensors being connected to the controller for communicating identification requests thereto. The first detector further includes a multiplicity of second circuit portions associated with respective outgoing trunks. A first circuit portion associated with a respective line forms a closed circuit, upon the execution of a loop-closing operation at the switchboard, with a second circuit portion associated with a concomitantly selected trunk, thereby energizing a corresponding sensor of the detector matrix to emit an identification-request signal to the controller.

The second detector includes another matrix of additional current sensors each operationally coupled with a respective third circuit portion in turn associated with a respective trunk, the additional sensors being connected to the controller for communicating thereto the identity of a selected trunk. A multiplicity of fourth circuit portions associated with respective lines each incorporate a normally open switch closable by the controller. A third circuit portion associated with a selected trunks forms a closed circuit, upon the execution of a loop-closing operation at the switchboard and upon the closing of the switch in a fourth circuit portion associated with a selected line, with this fourth circuit portion, thereby energizing one of the additional sensors to emit to the controller a signal identifying the selected trunk.

According to a more particular feature of our present invention, the sensors are magnetic induction elements emitting hysteresis-dependent signals. The first and fourth circuit portions are connected to a source of relatively low voltage whereas the second and third circuits portions are energized from a source of relatively high voltage, the several circuit portions including resistors and diodes for controlling the magnitude and direction of current flow through the sensors.

According to another feature of our present invention, the line identifier may comprise a pair of structurally identical controllers functioning in a master-subordinate relationship reversible upon completion of an identification process, the controllers being interconnected to enable a subordinate controller to perform checks on the signals received by the other controller. Each controller may include an integrator for recognizing real state transitions in the outputs of the sensors and a message former connectable to a computer for informing same of the identities of a selected line and a concomitantly selected trunk upon successful completion of an identification process.

According to yet another feature of our present invention, the connection-implementing switches are double-pole double-throw switches connected to the circuit portions, the lines and the trunks for forming a communication link between a selected line and a selected trunk upon breaking a first connection between a first circuit portion and a second circuit portion for identifying the selected line and a second connection between a third circuit portion and a fourth circuit portion for identifying the selected trunk.

Pursuant to still another feature of our present invention, the sensors have separate connections extending to the controllers, each of which has a serializer for converting parallel signals from the sensors into a time-division signal sequence or multiframe, whereby line identity and trunk identity are coded by temporal position in the multiframe. Each controller further includes a series-to-parallel interface having output connections extending to respective relays actuating respective switches in response to energizing signals generated by a controller upon a successful identification. Additional sensors operationally coupled to respective relays and to the controllers emit thereto confirmation signals indicating the activation status, i.e. the operated or not-operated condition, of the relays.

Pursuant to further features of our present invention, each controller also includes a memory for storing alarm bits coding the failure status of the relays, e.g. a number of times each relay has failed to operate in the expected manner. A logic network communicating with the memory has input connections from the serializer of the respective controller for updating the alarm bits at least partially in response to the confirmation signals from the sensors checking the operation of the relays. The logic network advantageously includes a cascade of flip-flops connected to the serializer for detecting and registering the occurrence of a plurality of trunk-identifying signals from the second detector upon an enabling thereof in response to an acceptable request from the first detector. A microprocessor is inserted between the flip-flop cascade and the interface for selectively activating connection-implementing relays upon the detection of a single trunk-identifying signal concomitant with an identification request. The acceptability of a request is established by an additional flip-flop in the logic network, connected to the memory and to the serializer, request acceptability being at least partially a function of the failure status of relays associated with the requesting sensor; the microprocessor receives an output signal of the additional flip-flop for selectively closing via the interface the switches in the fourth circuit portions to enable the second detector upon receipt of an acceptable request from the first detector.

Each controller may include a multiplexer downstream of the serializer for inserting test bits into the time-division sequence or multiframe, a second microprocessor connected to the logic network and to the interface for selectively activating relays associated with trunks only, and a device linked to the second microprocessor for coacting therewith to test the operation of the relays associated with the trunks.

BRIEF DESCRIPTION OF THE DRAWING

These and other features of our present invention will now be described in detail, reference being made to the accompanying drawing in which:

FIG. 2 is a partially schematic circuit diagram representing portions of the sensor matrices shown in FIG. 1;

FIGS. 4A–4C, together, are a circuit diagram of the logic network shown in FIG. 3;

FIG. 5 is a block and circuit diagram of the exerciser shown in FIG. 3;

FIG. 7 is a block diagram of the message former shown in FIG. 3;

FIGS. 8A–8E, together, constitute a flow-chart diagram of the operations of one of the microprocessors shown in FIG. 3;

FIGS. 10A and 10B, together, constitute a flow-chart diagram of the other microprocessor shown in FIG. 3; and FIG. 11 is a block diagram of the microprocessor whose operation is indicated in FIGS. 8A–8E.

SPECIFIC DESCRIPTION

Figure 1:
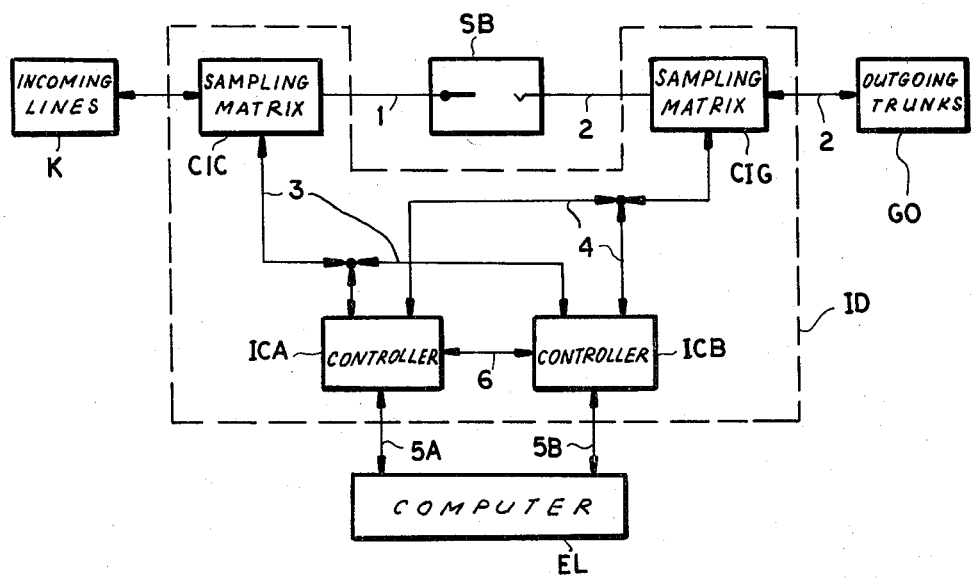
FIG. 1 is a block diagram of a line identifier according to our present invention, showing sensor matrices connected to a pair of identical controllers.

As shown in FIG. 1, an electronic device ID for automatically identifying incoming and outgoing lines selected for interconnection by means of manual operations at a switchboard SB comprises a first peripheral unit CIC inserted in a multiple 1 extending from a set of incoming lines or trunk circuits K to the plugs of switchboard SB and a second peripheral unit CIG inserted in another multiple 2 connecting outgoing trunks GO to the sockets of switchboard SB. As described more fully hereinafter with respect to FIGS. 2 and 6, units CIC and CIG include matrices of signal sensors $N_r$, $N_y$, $N_p$ and $N_g$, $N_f$, $N_o$ communicating with a pair of central identification control circuits ICA, ICB via respective leads of multiples 3 and 4. In response to signals received from sensors $N_r$, $N_y$, $N_p$, $N_g$, $N_f$, $N_o$, control circuits ICA, ICB energize relays P, F (FIGS. 2 and 6) to implement the interconnection of selected incoming and outgoing lines indicated at switchboard SB. Circuits ICA, ICB are identical in structure, described hereinafter with reference to FIG. 3, and supplementary in function. During a cycle of operation, one circuit ICA, ICB acts as a "master" unit, executing all the operations necessary for effective functioning of device ID, while the other unit ICA, ICB serves as a "slave", performing checks on the master. Preferably, circuits ICA, ICB interchange roles upon the completion of an operation cycle. As illustrated in FIG. 1, a computer EL is tied to circuits ICA, ICB via respective bidirectional multiples 5A, 5B for receiving information pertaining to successful identifications and for transmitting commands.

Sensors $N_r$, $N_y$, $N_p$, $N_g$, $N_f$, $N_o$, schematically illustrated in FIG. 2, may comprise magnetic cores with rectangular hysteresis loops. Core $N_r$ has a reading winding tied at one end to a negative voltage $-V_1$ via a diode $D_2$ and a resistor $R_1$ and couplable at another end to a plug connection $1b'$ via a switch $p_b$ operated by relay P. This relay has a primary holding winding energizable by control circuits ICA, ICB via a wire 301 of multiple 3 and a secondary winding energizable by voltage $-V_1$ upon the closing of a switch $p_c$ by relay P. Switch $p_c$ is connected to wire $1c$ via magnetic current sensor $N_p$ and a holding circuit CR which functions to maintain the flow of current through the secondary winding of relay P as long wire $1c$ is energized. The output or writing winding of sensor $N_p$ communicates with identifier circuit ICA, ICB via multiple 3 and an interface $SCI_1$, serving to adapt sensor output signals to the circuits of the identifiers ICA, ICB.

Magnetic sensor $N_y$ of unit CIC samples the current level of a wire extending from voltage source $-V_1$ over a diode $D_1$ to a plug connection $1a'$, the current level of that wire depending in part on the states of a pair of switches $P_a$, $P_y$ operated by relay P and a further relay Y, respectively. Upon the effective energization of relay Y by identifier circuits ICA, ICB via multiple 3, sensor $N_y$ emits an activation-confirmation signal BY for transmission over interface $SCI_1$, as described more fully hereinafter.

Core $N_g$ of sampling unit CIG has a reading or input winding tied at one end to a source of voltage $-V_2$, negative with respect to voltage $-V_1$, via a resistor $R_2$ and couplable at another end to a socket connection $2a'$ of switchboard SB via a switch $f_a$. This switch is ganged with two further switches $f_b$, $f_c$ for simultaneous operation by relay F in turn energized by a signal transmitted from a master identifier ICA or ICB via a lead 401 of multiple 4. As shown in FIG. 2, switch $f_b$ normally links a socket connection $2b'$ to a resistor $R_3$ in turn permanently tied to voltage source $-V_2$. Upon the activation of relay F, switch $f_b$ breaks the link between connection $2b'$ and resistor $R_3$ and establishes a path from connection $2b'$ to a wire $2b$ of outgoing trunk multiples 2; current on lead 401 similarly induces the formation of a path linking connection $2a'$ and a wire $2a$ associated with trunk line $2b$. The actuation of switch $f_c$ closes a circuit extending from voltage source $-V_1$ over resistor $R_4$ and sensor $N_f$ to ground, this sensor supplying identifiers ICA, ICB with a signal BF for confirming the activation of relay F. Sensor $N_f$, together with cores $N_g$ and $N_o$, has a writing winding extending to the identifiers ICA, ICB via an interface $SCI_2$ identical in structure with circuits $SCI_1$. Sensor $N_o$ has an input winding connected to a trunk line $2c$ for detecting the presence of current on associated outgoing trunk lines $2a$, $2b$.

For each incoming loop of set K (FIG. 1) there is advantageously provided a respective relay pair P, Y and respective sensors $N_p$, $N_r$, $N_y$. Likewise, to each outgoing trunk of group GO are assigned a respective ganged switch $f_a$, $f_b$, $f_c$ operated by an associated relay F, and respective current sensors $N_f$, $N_g$, $N_o$. The peripheral units CIC, CIG may incorporate the sensors $N_p$, $N_r$, $N_y$ and $N_f$, $N_g$, $N_o$ in respective matrices.

Upon the manual insertion of a plug connection $1a'$, $1b'$, $1c'$ into a socket connection $2a'$, $2b'$, $2c'$, core $N_r$ emits to identifiers ICA, ICB a signal BR indicating current flow from source $-V_1$ through resistor $R_1$ and diode $D_2$, over switch $p_b$, plug-socket connection $1b'$, $2b'$ and switch $f_b$, and through resistor $R_3$ to source $-V_2$. The master identifier ICA or ICB responds, as described in detail hereinafter, to this identification request BR by energizing relay Y. The consequent closing of switch $r_y$ establishes a current path from source $-V_1$ over switchboard connection $1a'$, $2a'$ to voltage source $-V_2$. Current sensor $N_y$ associated with the selected incoming loop $1a$, $1b$, $1c$ then emits activation confirmation BY, while sensor $N_g$ associated with the selected outgoing trunk $2a$, $2b$, $2c$ generates a signal BG utilized by the control circuits ICA, ICB for identifying the selected outgoing trunk. Upon the execution of a successful identification, the master controller ICA or ICB energizes leads 301 and 401, thereby breaking the circuits monitored by sensors $N_r$, $N_y$ and $N_g$ and forming a current path linking the selected incoming loop $1a$, $1b$ with the selected outgoing trunk $2a$, $2b$. The activation of relays P and F is checked by control circuits ICA, ICB via sensors $N_p$ and $N_f$. Relay P is deactivated by holding circuit CR only upon the cessation of current in lead $1c$, while relay F is de-energized by the master controller ICA or ICB upon the reception from relay $N_o$ of a signal BO indicating the absence of current on lead $2c$ or upon the setting of an alarm bit $BF_a$, as described in detail hereinafter with reference to FIGS. 4C and 10A.

Figure 3:
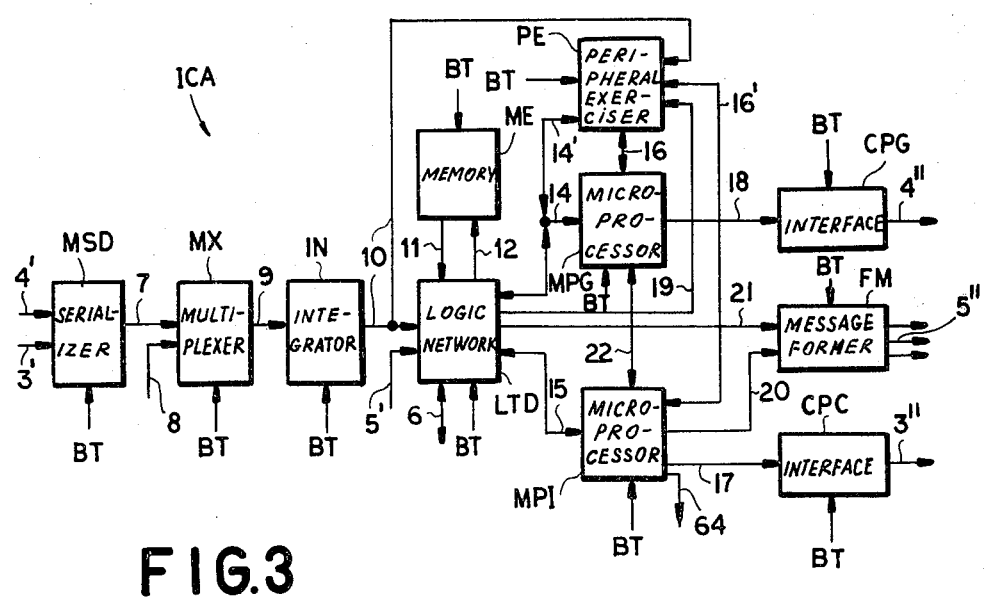
FIG. 3 is a block diagram of a controller of FIG. 1, showing a logic network connected to a pair of microprocessors, to a message former and to a relay-testing device or exerciser.

As shown in FIG. 3, identifier or control circuit ICA (or ICB) comprises a serializing frame synthesizer MSD receiving in parallel on incoming multiple leads 3' and 4' the output signals BP, BR, BY and BF, BG, BO of sensors $N_p$, $N_r$, $N_y$ and $N_f$, $N_g$, $N_o$, respectively. In response to clock signals BT from a time base (not shown), synthesizer MSD converts the parallel signals on leads 3', 4' into a time-division frame transmitted over a lead 7 to a multiplexer MX; the frame may have 2068 time slots and a total duration of 8 msec. Multiplexer MX, also in response to clock signals BT, inserts into the serialized frame, emitted by synthesizer MSD, diagnostic signals transmitted via a lead 8 from nonillustrated testing equipment. The resulting pulse train is carried by a lead 9 to a unit IN synchronized with frame synthesizer MSD and multiplexer MX by clock signals BT for digitally integrating the samples in this train to distinguish between actual and spurious signal transitions. Integrator IN may also function in part as a series-to-parallel converter or decoder for transmitting several predetermined pulses over respective leads of a multiple 10 extending to a logic network LTD and to a circuit PE for testing the operation of relays F, as described hereinafter with reference to FIG. 5.

Logic network LTD communicates with a memory ME via a reading multiple 11 and a writing multiple 12, with computer EL via a lead 5', with unit PE via a lead 19, with a pair of microprocessors MPG and MPI via respective multiples 14 and 15, with a message former FM via a lead 21, and with the corresponding logic network of the twin controller ICB via multiple 6. Logic network LTD has the tasks of determining whether an indentification request BR can be accepted for processing, updating bits stored in memory ME for indicating the operational status of relays F, P, Y, checking synchronization between master controller ICA or ICB and its twin ICB or ICA, and signaling microprocessor MPI in the event of improperly responding cores $N_y$ and $N_g$. These and other tasks of logic network LTD are described in detail hereinafter with reference to FIGS. 4A–4C. Network LTD, as well as memory ME, microprocessors MPG and MPI, testing unit PE and message former FM, receives time-base signals BT for synchronization and control.

As illustrated in FIG. 11, microprocessor MPI (or MPG) includes a central processor CPU communicating with a read/write data memory RAM and a read-only microprogram memory ROM via a bidirectional signal path or bus BS. Processor CPU and memory RAM receive data bits from logic network LTD via leads 15', formed as part of multiple 15, and an input port IP which also transfers to bus BS signals arriving from testing unit PE over a lead of a bidirectional multiple 16' and from microprocessor MPG on a conductor of a bidirectional multiple 22. As shown in FIG. 3, microprocessor MPI has, in addition to output leads of multiples 15, 16' and 22 extending to logic network LTD, exerciser or testing unit PE and microprocessor MPG, two output connections 17 and 21 tied to an interface CPC and to message former FM, respectively. These output leads and connections originate at an output port OP (FIG. 11) linked to bus BS for interfacing processor CPU with several components of identifier ICA.

Microprocessor MPG is identical in structure with microprocessor MPI and is tied to exerciser PE via a bidirectional multiple 16 and to an interface CPG via an output lead 18. Interfaces CPC, CPG serve as series-to-parallel converters synchronized by time-base signals BT to energize selected leads of multiples 3", 4" in response to the logic levels of leads 17, 18, respectively.

As shown in FIG. 4A, logic network LTD includes a pair of D-type flip-flops $FF_{19}$, $FF_{20}$ having data inputs D connected to memory ME (FIG. 3) via respective leads 1119, 1120 of multiple 11 for receiving a previously stored prealarm bit $BP_p$ and alarm bit $BP_a$ together indicating the operational status of a relay P. Flip-flop $FF_{19}$ has a negated setting input energizable by a NAND gate 207 in turn enabled by time-base pulses BT to respond to the output of an OR gate 208. This OR gate is tied at one input to microprocessor MPI via a lead 1502 forming part of multiple 15 (FIG. 3) and at another input to an AND gate 209 receiving signals from integrator IN via a lead 104 and from microprocessor MPI via a lead 1504 and via another lead 1503 and an inverter 210. Thus, a high logic level may be given to a prealarm bit $BP_p$, if it is not already set, either directly by microprocessor MPI or by integrator IN, provided that component MPI is in a predetermined state. If a prealarm bit $BP_p$ is set, the corresponding alarm bit $BP_a$ may be set by the output signal of OR gate 208, this signal being fed to a negated setting input of flip-flop $FF_{20}$ via an AND gate 213 and a NAND gate 214 respectively enabled by an output level of flip-flop $FF_{19}$ and a clock pulse BT. Bits $BP_p$ and $BP_a$ are susceptible to manual reset by means of a lead 100 extending to a negated resetting input of flip-flop $FF_{19}$ via a NOR gate 211 and to a negated resetting input of flip-flop $FF_{20}$ via an inverter 215. A prealarm bit is also resettable automatically by a pulse transmitted from microprocessor MPI over a lead 1505 and an AND gate 212 which is enabled by time-base pulses BT.

Flip-flops $FF_{19}$, $FF_{20}$ have set outputs Q tied via leads 1219, 1220 of multiple 12 to memory ME for feeding thereto updated values for bits $BP_p$, $BP_a$, time-base signals BT being fed to clock-pulse inputs cp of flip-flops $FF_{19}$, $FF_{20}$ for enabling the operation thereof. Flip-flop $FF_{20}$ has a reset output $\overline{Q}$ transmitting the inverted logical value $\overline{BP_a}$ of an alarm bit $BP_a$ to a negated input of an OR gate 202 which receives at another negated input the complement $\overline{BY_a}$ of an alarm bit $BY_a$ assigned to the relay Y associated with the relay P whose operational status is indicated by the updated bits $BP_p$, $BP_a$ emitted on leads 1219, 1220. The output signal of OR gate 202 is conducted via an inverter 201 to a NAND 200 for in part determining the logical value of a bit Rr indicating whether an extant identification request BR can be accepted for processing by control circuit ICA. NAND gate 200 has input connections 101, 102 extending from integrator IN for carrying signals representing the presence of an identification request BR; gate 200, synchronized by a time-base signal BT, works into a negated input of a flip-flop $FF_{18}$ for bringing the acceptability bit Rr to its high value. Flip-flop $FF_{18}$ receives a previously determined value of a bit Rr from memory ME via a lead 1118 and emits an updated value of the same bit to memory ME via a connection 1218 and to microprocessor MPI via a path 1500. A request-acceptability bit Rr may be reset by a pulse from any of three AND gates 204, 205, 206 having outputs extending to a negated resetting input of flip-flop $FF_{18}$ through a NOR gate 203, and three AND gates being simultaneously enabled by the same clock pulses BT. A lead 103 extending from integrator IN to gate 204 is energized to indicate the absence of an identification request BR, whereby an acceptability bit Rr previously set for validating a request may be reset upon the disappearance of the same request. Microprocessor MPI can make low a bit Rr by emitting a pulse on a lead 1501 extending to gate 205, while the existence of an alarm bit $BP_a$ or $BY_a$ will cause, via OR gate 202, the generation of a pulse by AND gate 206. Thus, the acceptance of an identification request BR by master controller ICA depends at least in part upon a nonalarm status of relays P and Y.

Figure 4B:
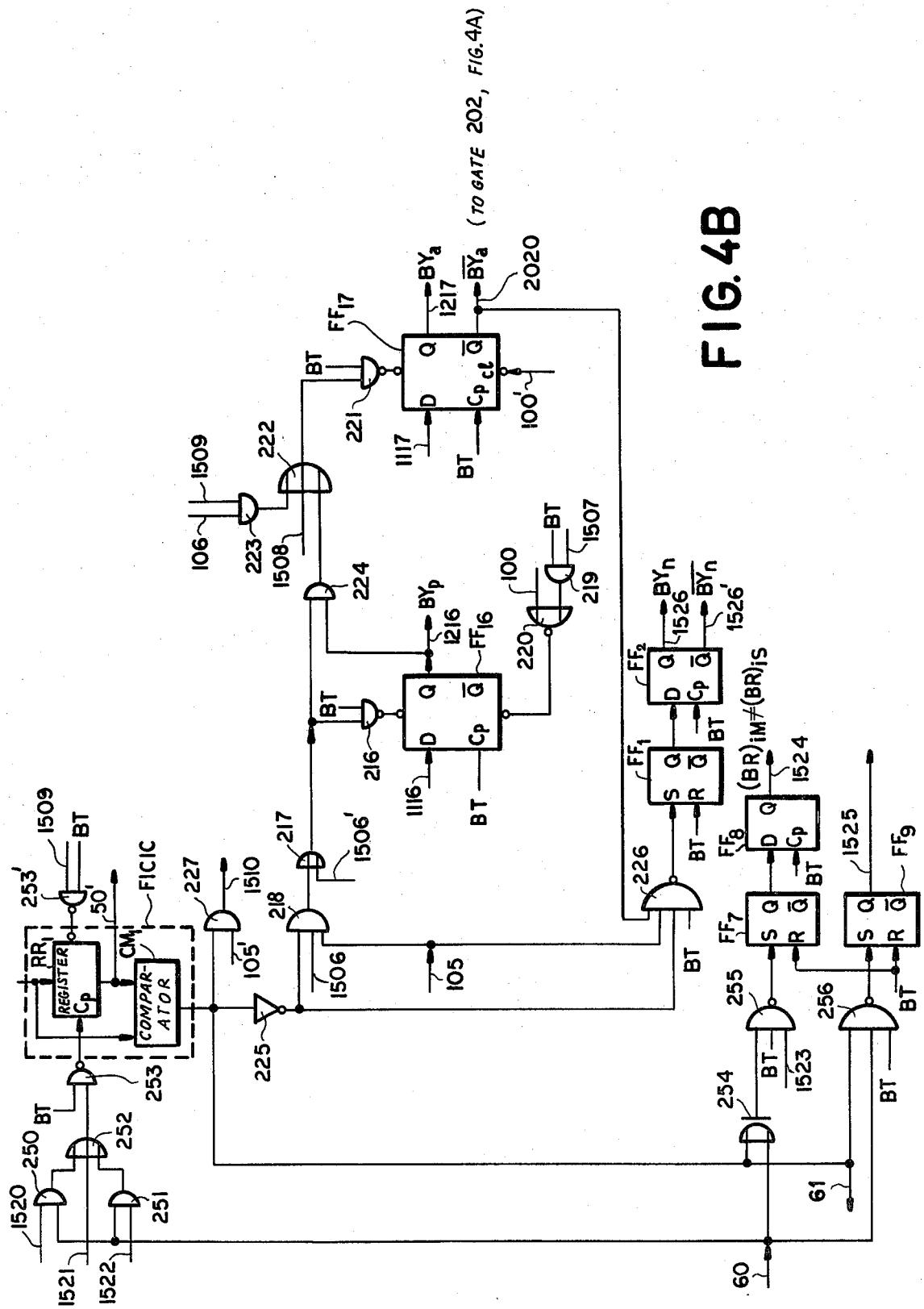

As shown in FIG. 4B, logic network LTD further comprises a pair of flip-flops $FF_{16}$, $FF_{17}$ connected to memory ME by data-input leads 1116, 1117 and data-output leads 1216, 1217 for the updating of prealarm and alarm bits $BY_p$, $BY_a$ together coding the operational status of relay Y. A prealarm bit $BY_p$ having a previously registered high logic level is reset either by a pulse manually induced on lead 100 or by a pulse generated on a lead 1507 by microprocessor MPI; lead 100 works into a negated resetting input of flip-flop $FF_{16}$ via a NOR gate 220, while lead 1507 is connected to this resetting input via gate 220 and an AND gate 219 enabled by clock pulses BT. A logically low-level bit $BY_p$ is made high by microprocessor MPI via a lead 1506', an OR gate 217 and a clocked NAND gate 216 feeding a negated setting input of flip-flop $FF_{16}$; a prealarm bit $BY_p$ is also made high by a pulse appearing on a lead 105 extending from integrator IN to an AND gate 218 which feeds a second input of OR gate 217 and has a pair of enabling inputs, one of them coupled to microprocessor MPI via a lead 1506 and the other extending from an inverter 225. This inverter is supplied with binary signals by a comparator $CM_1$.

Comparator $CM_1$ forms a part of a circuit FICIC whose function is to selectively enable subsequent circuit elements in accordance with an accepted identification request BR. Upon accepting a request, microprocessor MPI energizes a lead 1521 extending to an address register $R_1$ via an OR gate 252 and a clocked NAND gate 253 for enabling the memorization in register $R_1$ of an address signal BTA fed thereto from the common time base (not shown). A memorized address is held by register $R_1$ on a multiple 50' for comparison in device $CM_1$ with address signals BTA arriving at circuit FICIC during respective time slots of a processing cycle. Equality between an address stored in register $R_1$ and an address arriving from the time base induces comparator $CM_1$ to energize a lead extending to an AND gate 227, to inverter 225, to an Exclusive-OR gate 254, to a NAND gate 256 and to the corresponding logic network LTD of twin controller ICB (lead 61). Such energization of the output of comparator CM constitutes the selection of recurrent time slots $s_y{}^i$, $s_r{}^i$ corresponding to signals $BY^i$, $BR^i$ from cores $N_y{}^i$, $N_r{}^u$ from which an identification request has been accepted for processing. As described in detail hereinafter, the output signal of circuit FICIC enables the updating of prealarm and alarm bits $BY_p$, $BY_a$ in the event of high-level signals being generated by cores $N_y$ associated with relays Y which have not been activated during the processing of an identification request.

As shown in FIG. 4B, OR gate 252 is fed by a pair of AND gates 250, 251 which have a common input lead 60 extending from twin controller ICB and respective inputs connected via leads 1520, 1522 to microprocessor MPI. Leads 1520, 1522 are energized by microprocessor MPI only if identification controller ICA is enslaved or subordinated to controller ICB, i.e. if its twin ICB acts as the master, lead 1520 being energized to set enabling circuit FICIC of the slave controller upon the reception thereby of an identification request in the same time slot as a request previously or simultaneously accepted by the master controller, such acceptance being signaled by a pulse on lead 60. Register $R_1$ of the slave controller is loaded with an address in response to a pulse on lead 1522 during a transfer of contents of memory ME from the master to the slave prior to a switching of roles.

A NAND gate 253' with a time-base input (BT) an input lead 1509 extending from microprocessor MPI works into register $R_1$ for resetting same when that microprocessor is idle as master, i.e. between processing cycles. Output lead 50° of register $R_1$ is connected to computer EL, as well as to comparator $CM_1$.

Logic network LTD further includes an S-R flip-flop $FF_1$ and a D-type flip-flop $FF_2$ connected in cascade to an output of NAND gate 226 for detecting the generation of high-level signals by cores $N_y$ associated with relays Y which have not been activated in response to an existing identification request, flip-flop $FF_2$ informing microprocessor MPI of such a detection via signals $BY_n$, $\overline{BY}_n$ on leads 1526, 1526'. NAND gate 226 has an inputs from integrator IN (lead 105), from inverter 225 and from the time base, as well as an input connection 2020 extending from an inverted output Q of flip-flop $FF_{17}$ for disabling the setting of flip-flop $FF_1$ by gate 226 during any time slot $s_y$ allotted to a relay Y for which an alarm bit $BY_a$ has been registered. An alarm bit $BY_a$ is updatable by an operator via a lead 100' tied to a resetting input of flip-flop $FF_{17}$ and by microprocessor MPI either unconditionally via a lead 1508, an OR gate 222 and a clocked NAND gate 221 or, depending on the output of flip-flop $FF_{16}$, via lead 1506', gate 217, an AND gate 224 and gates 222, 221, NAND gate 224 being conditioned by the value of a prealarm bit $BY_p$. An alarm bit $BY_a$ may also be made high a pulse emitted by integrator IN over a lead 106 feeding an AND gate 223 enabled by microprocessor MPI via lead 1509 and tied to an input of OR gate 222.

As heretofore described, comparator $CM_1$ energizes inputs of gates 254, 256. These gates also receive, via lead 60, output signals from a corresponding comparator in twin controller ICB and serve in the control of flip-flops $FF_8$, $FF_9$ which are connected to microprocessor MPI via respective leads 1524, 1525 for informing same as to the reception of identical requests BY by, and the synchronization of the microprograms of, the twin controllers ICA, ICB. OR gate 254 sets flip-flop $FF_8$ by means of a NAND gate 255 also receiving an enabling time-base signal BT and a conditioning signal from microprocessor MPI via a lead 1523; gate 255 works into an S-R flip-flop $FF_7$ at a setting input S thereof, this flip-flop in turn having a set output Q connected to the data input D of D-type flip-flop $FF_8$. NAND gate 256, synchronized with gate 255 and with flip-flops $FF_7$, $FF_9$ by time-base signal BT, functions to energize the setting input S of S-R flip-flop $FF_9$.

As shown in FIG. 4C, logic network LTD further includes a first pair of D-type flip-flops $FF_{22}$, $FF_{23}$ having respective data-input leads 1122, 1123 and data-output leads 1222, 1223 connected to memory ME for updating prealarm and alarm bits $BG_p$, $BG_a$ in part indicating the operational status of the sensors $N_g$ which identify switchboard-selected outgoing trunks GO (FIG. 1). The prealarm and alarm bits $BG_p$, $BG_a$ are made high by a pair of NAND gates 230, 234 feeding negated setting inputs of flip-flops $FF_{22}$, $FF_{23}$ and receiving as inputs a time-base signal BT, the output of an AND gate 231 and a signal from microprocessor MPI via a lead 1512. Gate 234 further receives from the set output terminal Q of flip-flop $FF_{22}$ the value of a prealarm bit $BG_p$; thus, the alarm flip-flop $FF_{23}$ may be set only on the condition that the prealarm flip-flop $FF_{22}$ is already set. As described hereinafter with reference to FIGS. 8A-8E, microprocessor MPI energizes lead 1512 both upon the reception of a first non-zero voltage sample BG from a core $N_g$ after activation of a relay Y, whereby subsequently responding cores $N_g$ will have their registered operational status modified, and if no relay Y is presently activated. A prealarm bit $BG_p$ is reset by microprocessor MPI via a lead 1513, an AND gate 232 and a NOR gate 233, provided a corresponding alarm bit $BG_a$ is not already high, the inversion $\overline{BG}_a$ of this alarm bit being fed from flip-flop $FF_{23}$ to gate 232 for disabling same. Bits $BG_p$, $BG_a$ may be made low by an operator via respective leads 100, 100'.

A second pair of D-type flip-flops $FF_{24}$, $FF_{25}$ shown in FIG. 4C reads prealarm and alarm bits $BF_p$, $BF_a$ via respective leads 1124, 1125 from memory ME and writes updated bits therein via leads 1224, 1225. A prealarm bit $BF_p$ is made high by the simultaneous energization by integrator IN and microprocessor MPG (FIG. 3) of respective leads 109, 140 formed as parts of multiples 10, 14 and feeding an AND gate 237 which is tied to a negated setting input of flip-flop $FF_{24}$ via an OR gate 236 and a clocked NAND gate 235. A bit $BF_p$ may also be set directly by microprocessor MPG via a lead 141 connected to OR gate 236. The output of gate 236 also extends to a setting input of flip-flop $FF_{25}$ via a clock-synchronized AND gate 240, an OR gate 241 and an inverter 242, gate 240 receiving as a conditioning or enabling signal the set output $BG_p$ of flip-flop $FF_{24}$. Flip-flops $FF_{25}$, $FF_{24}$ have resetting inputs respectively coupled to lead 100' and to a NOR gate 238 having one input energizable via lead 100 and another input via an AND gate 239. This gate resets a prealarm bit $BF_p$ upon receiving pulses of a high logic level from the time base, from microprocessor MPG via lead 142 and from an inverted output $\overline{Q}$ of flip-flop $FF_{25}$.

A subcircuit of logic network LTD designed to inform microprocessor MPI of the singularity or multiplicity of cores $N_g$ which generate high-level signals BG upon the activation of a relay Y includes two S-R flip-flops $FF_3$, $FF_4$ and yet another pair of D-type flip-flops $FF_5$, $FF_6$. That subcircuit has a single input lead extending to a NAND gate 245 from an AND gate 243 tied at a first input to gate 231 for receiving a pulse indicating the excitation of a sensor $N_g$ associated with a non-disabled outgoing trunk 2a, 2b, at a second input to a lead 110 for receiving from integrator IN a signal indicating a deactivated state of a relay F associated with such sensor and outgoing trunk, and at a third input to the inverted output $\overline{Q}$ of flip-flop $FF_{25}$ for receiving a signal indicating the non-alarm status of such relay F.

The generation of a first high-level pulse by gate 243 during a processing cycle induces gate 245 to set flip-flop $FF_3$ which in turn sets flip-flop $FF_6$. If a second pulse is generated by gate 243, flip-flop FF₄ is set by means of a NAND gate 246 linked at respective inputs to gate 243, to the set output Q of flip-flop FF₃ and to the time base. The time-base signal fed to gate 246 is staggered relative to clock pulses applied to gate 245, thereby preventing the setting of flip-flop FF₄ by a first pulse from gate 243 during an identifier processing cycle. A voltage of high logic level at the set output Q of flip-flop FF₄ sets flip-flop FF₅ and resets flip-flop FF₃ via a time-base-synchronized NAND gate 246' with the consequences that flip-flop FF₆ is reset and NAND gate 240 is disabled for the remaining portion of the identifier cycle. Thus, upon scanning output leads 1515, 1516 or 1515', 1516' of flip-flops FF₅, FF₅ for signals $\overline{BG}_v$, $\overline{BG}_m$ or $BG_v$, $BG_m$ at the end of a cycle, microprocessor MPI determines whether a single core (high-level $BG_v$, low-level $BG_m$), a plurality of cores (low-level $BG_v$, high-level $BG_m$), or no cores (low-level $BG_v$, $BG_m$) constituting sensors $N_g$ have generated signals BG during respective recurrent time slots $s_{fg}$ allotted to such sensors. Flip-flops FF₃, FF₄ are reset by a time-base signal BT at the end of a processing cycle, while flip-flops FF₅, FF₆ are enabled by the same clock pulse during each time slot $s_{fg}$, these flip-flops being provided with resetting inputs connected to gate 246 for being cleared upon termination of an identifier cycle.

AND gate 243 also works into a pair of address-comparing units FICIG and FICIG⁻via a NAND gate 244 and an AND gate 247, respectively, those units having the same structure as circuit FICIC (FIG. 4B). Unit FICIG compares during each time slot $s_{fg}$ a time-base-generated address signal BTA and an address previously loaded into a register of unit FICIG in response to a pulse from gate 244 and, upon a positive comparison, emits a pulse on a lead 62 to microprocessor MPI of twin controller ICB. Gate 244 is enabled by a conditioning signal transmitted on a lead 1513 from microprocessor MPI and has an output lead 1514 extending thereto.

Gate 247 has input connections from the set-output lead 1515 of flip-flop FF₆, from the time base and from microprocessor MPI (via a lead 1517), as well as from AND gate 243, for setting address comparator FICIG' upon the reception by identifier ICA of a first non-zero core response BG while in a subordinate or slave state, provided that the outgoing trunk associated with the responding core is not disabled and that the associated relay F is neither operated nor in a state of alarm. Lead 1517, energizable to indicate that the respective identifier ICA or ICB is performing a subordinate function, also extends to a NAND gate 248 receiving an output voltage from the address comparator FICIG' of the slave unit ICA of ICB and a signal via a lead 62' from the address comparator FICIG or the master unit ICB or ICA. Gate 248 serves to set a flip-flop FF₁₀ of the slave unit for emitting to the microprocessor MPI thereof via a lead 1527 a signal $BG_{MS}$ indicating the reception by the master and slave controllers ICA, ICB of the same identification response signal BG. Flip-flop FF₁₀ is resettable via a NAND gate 249 having a first input from the time base and a second input from lead 1517 via an inverter 249', whereby flip-flop FF₁₀, in addition to comparison unit FICIG', is reset upon the de-energization of lead 1517 and the thereby-signaled temporary cessation of a subordinate function by the present slave controller.

Logic network LTD includes one further D-type flip-flop FF₂₁ connected to memory ME via leads 1121, 1221 for updating a trunk-disabling bit $BG_d$. Such a bit is made high upon the appearance, on a lead 107 from integrator IN, of a potential corresponding to the energization of a sensor $N_g$, provided that microprocessor MPI is not in a state entraining the activation of at least one relay Y, as coded by a signal from microprocessor MPI on a lead 1509. Leads 107, 1509 and a time-base output are connected to a NAND gate 228 feeding a negated setting input of flip-flop FF₂₁. A resetting input of this flip-flop is linked via a NAND gate 229 to microprocessor and integrator output leads 1511, 108 for resetting a bit $BG_d$ upon the de-excitation of a core $N_g$ during predetermined states of microprocessor MPI. Flip-flop FF₂₁ has an inverted output $\overline{Q}$ extending to AND gate 231 for disabling the transmission of an identification-response signal from lead 107 toward flip-flops FF₂₂, FF₂₃ and gate 243 in the event of an improperly responding core $N_g$.

As shown in FIG. 5, the circuit PE for controlling the testing of relays F in response to an operator command includes a memory MR loaded or set by means of a manual start button MSB and coupled to an input of a NAND gate 257 having other inputs energizable by a time-base signal BT at the end of a processing cycle, by the inversion $\overline{FS}$ of a signal FS indicating an out-of-service state of the respective indentification controller ICA (or ICB), and by a signal $\overline{BPX}$ (or $\overline{APX}$) generated by the testing circuit PE of the other controller ICB (or ICA) if the same is not presently engaged in the testing of relays F. NAND gate 257 works into a flip-flop FF₁₁ via the setting input S thereof for inducing the generation of signal APX (the inversion of signal $\overline{APX}$) on a lead 1601' extending to microprocessor MPI as part of multiple 16' (FIG. 3) and to a NAND gate 258. Thus, a high-level voltage APX is produced by circuit PE of identifier ICA at the end of a processing cycle if memory MR has been manually set, if identifier ICA is not out of service and if the tester PE of the other identifier is not in the process of testing relays F. A further condition for the testing of a relay F by circuit PE of identifier ICA is that the latter is master, connected to gate 258 via a lead 1600' from microprocessor MPI. This gate also receives an end-of-cycle signal from the time base for setting, if leads 1600', 1601' are energized, a flip-flop FF₁₂ whose inverted output Q is connected directly to a resetting input of a J-K or clocked S-R flip-flop FF₁₃ and whose noninverted output $\overline{Q}$ is tied to a setting input of this flip-flop via a NAND gate 258' which also receives signals from microprocessor MPG via a lead 160 and an inverter 259 and from a flip-flop FF₁₄ on a lead 165. The de-energization of lead 160 signifies the enabling of component MPG by microprocessor MPI, while a high-level potential on lead 165 corresponds to the simultaneous occurrence of the following conditions: the transmission by the time base to a logic network LG of a signal TSG indicating that the present time slot $s_{fg}$ is at least partially allotted to the processing of a signal BF from a relay-monitoring sensor $N_f$; the supplying of a high-logic-level sample of such signal BF to network LG via lead 108 (see FIG. 4C); the energization of a lead 140' extending to network LG from flip-flop FF₂₅ of network LTD (FIG. 4C), indicating the nonalarm status of the relay F whose checking is assigned to the present time slot $s_{fg}$; the generation of a "1"-level signal by a comparator CM₂ upon detecting an identity between an address BTA from the time base and the contents of a counting register CTR; and the emission of a high voltage from the inverted output Q of a flip-flop FF₁₅.

Logic network LG is connected at an output to a stepping input of counter CTR via a NAND gate 264 and an OR gate 265 and to a setting input of flip-flop $FF_{14}$ via a NAND gate 260 and an inverter 263. NAND gate 260 also has input connections extending from comparator $CM_2$, the time base and the inverted output of flip-flop $FF_{15}$ for the implementation of the aforementioned conditions to the generation of signal CPX, while gate 264 is also linked to the output of comparator $CM_2$, to the time base, and to microprocessor MPG via a lead 163 which is de-energized thereby if a relay check is in process. OR gate 265 has an input lead 162 from microprocessor MPG, as well as an input from gate 264, lead 162 being also tied to the setting input S of flip-flop $FF_{15}$. This flip-flop is resettable by a NAND gate 268 in response to signals from inverter 263, comparator $CM_2$ and the time base.

Let us assume that a current time slot $s_{fg}{}^u$ is allotted to a relay $F^u$ whose address is held by counter CTR and which is presently not being checked by testing network PE and microprocessor MPG. Network LG will emit a pulse having a low logic level for preventing gate 264 from stepping the counter CTR, and for enabling gate 260 to set flip-flop $FF_{14}$, if signals TSG, BF and bit $\overline{BF}_a$ have respective logic levels "1", "0", and "0". If, in addition, microprocessor MPG has not emitted a pulse on lead 162 during a preceding time slot $s_{fg}{}^{u-1}$, thereby disabling testing unit PE for a cycle upon the completion of a check on a relay $F^{u-1}$, flip-flop $FF_{14}$ will energize lead 165 for initiating a test of relay $F^u$. If, on the other hand, signals TSG, BF and but $BF_a$ do not have logic levels "1", "0", and "0", respectively, network LG will emit a high-level pulse stepping counter CTR, whereby the same procedure is repeated in a subsequent time slot $s_{fg}{}^{u+1}$.

Comparator $CM_2$ is tied at an output to a NAND gate 261 in turn working into memory MR and flip-flops $FF_{11}$, $FF_{16}$ via resetting inputs thereof for clearing unit PE during a final time slot $s_{fg}{}^M$ in a cycle provided that counter CTR holds the address of a final relay $F^M$, i.e. a relay which is examined last in a predetermined testing sequence. The identity of final time slot $s_{fg}{}^M$ is signaled to gate 261 by an enabling signal BT from the time base.

Figure 6:
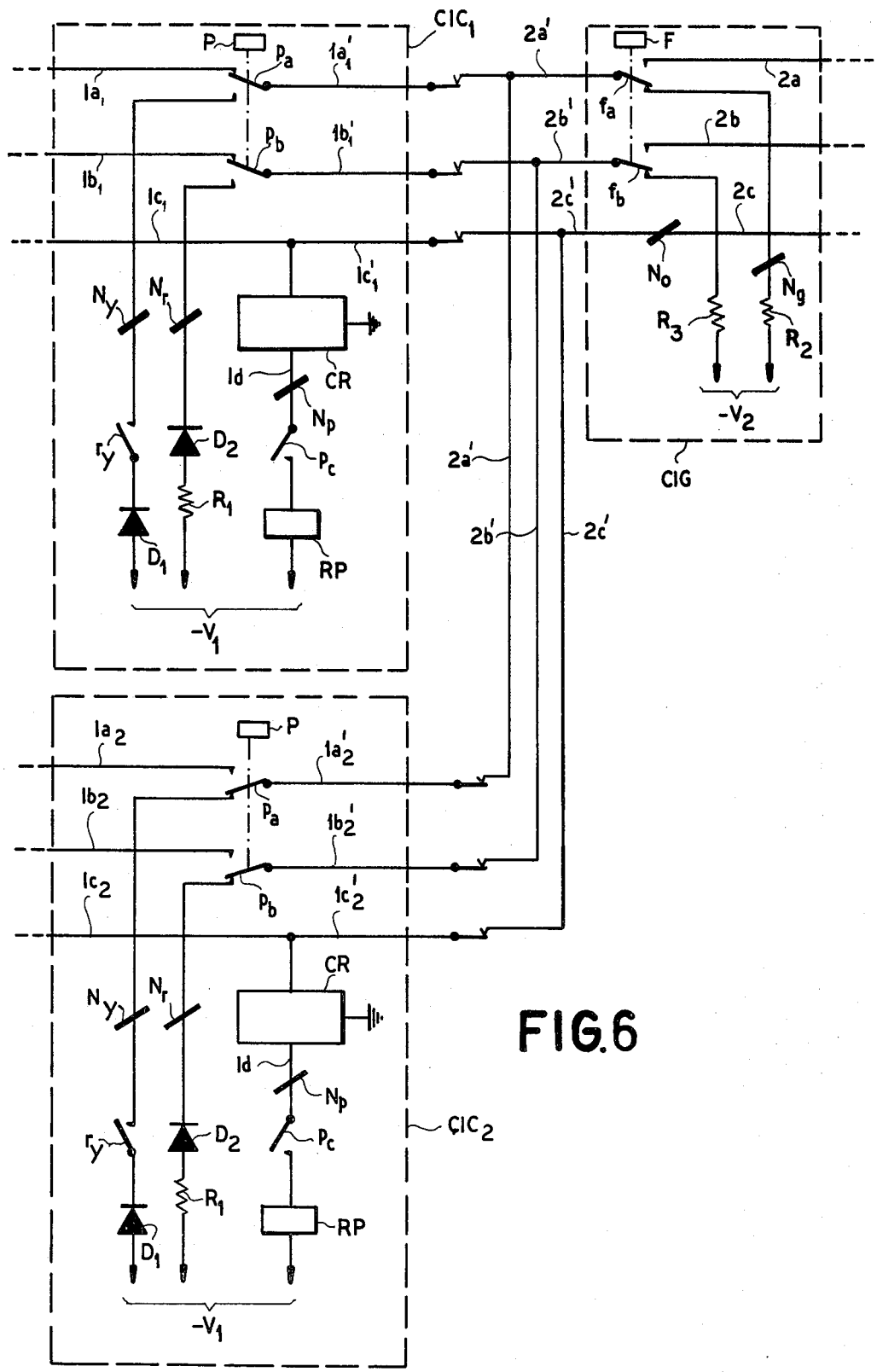
FIG. 6 is a diagram similar to FIG. 2.

As shown in FIG. 6, a circuit arrangement according to our present invention may also be used for setting up a conference call in which two (or more) incoming lines $1a_1$, $1b_1$, $1c_1$ and $1a_2$, $1b_2$, $1c_2$ are connected to one outgoing trunk $2a$, $2b$, $2c$. Let us assume that a single-input, single-output connection had already been established between incoming lines $1a_1$, $1b_1$, $1c_1$ and the outgoing trunk prior to the linking by an operator of plug or jack connections $1a_2'$, $1b_2'$, $1c_2'$ to socket connections $2a'$, $2b'$, $2c'$. Because the voltage on the outgoing trunk lines $2a$, $2b$, $2c$ is more positive than voltage $-V_1$, no current is conducted through the identification-request sensor $N_r$ of the second sampling matrix $CIC_2$ until the computer EL (FIG. 1) acts, upon receiving a signal from a switchboard pushbutton, to induce the deactivation of the relay F of the trunk-sampling matrix CIG. The de-energization of relay F does not disrupt the connection between incoming line $1c_1$ and outgoing line $2c$ and serves to initiate an identification operation involving circuits $CIC_2$ and CIG, as heretofore described with respect to FIG. 2. Upon the completion of a successful identification operation, the relays P of both incoming sampling matrices $CIC_1$, $CIC_2$ and the relay F of the outgoing matrix are energized and a three-way connection consequently established. Upon the elapsing of an extended interval without successful identification, the operator may request via another switchboard button the re-establishment of the original connection, the computer EL subsequently acting to reactivate relay F of the outgoing trunk circuit CIG.

A circuit arrangement according to our present invention may also serve to implement identification upon operations in the event of a call transfer. Let us assume that plug-in connection $1a_2'$, $1b_2'$, $1c_2'$, $2a'$, $2b'$, $2c'$ is made and that relay P of incoming sampling circuit $CIC_1$ is de-energized. Computer EL, becoming informed of the deactivation of the relay P, induces the de-energization of relay F of the outgoing trunk $2a$, $2b$, $2c$, whereupon an identification operation as heretofore described with reference to FIG. 2 may proceed for the newly selected incoming lines $1a_2$, $1b_2$, $1c_2$ (see FIG. 6).

As shown in FIG. 7, message former FM includes a first register $R_2$ loading from the time base an address BTA of an identified outgoing-trunk core $N_g$ and a parity bit BTP, also from the time base, in response to an enabling signal transmitted from microprocessor MPI on a lead 2001 formed as part of multiple 20 (FIG. 1). A second register $R_3$ is enabled by the signal carried on lead 2001 to temporarily store an address arriving over lead 50' from circuit FICIC (FIG. 4C) and another parity bit emitted by a generator PG in response to the address on lead 50'. Registers $R_2$, $R_3$ feed their contents to a multiplexer MU which has several inputs 2003 at respective fixed potentials for forming a code or label identifying message former FM of controller ICA (or ICB). Multiplexer MU has an output extending to computer EL via conventional line drivers LD and a lead of multiple 5'' (FIG. 3); a remote computer and testing equipment may also receive via line drivers LD the message msg formed in unit FM. The line drivers relay to the computers and to the testing equipment a signal rd indicating that information is ready for transmission, this data-ready signal originating in microprocessor MPG and arriving at line drivers LD via a lead 2002 (part of multiple 20), a time-base-synchronized NAND gate 266 and an inverter 267. The signal rd is fed to an enabling input of multiplexer MU for inducing the emission of data thereby.

Figure 8C:
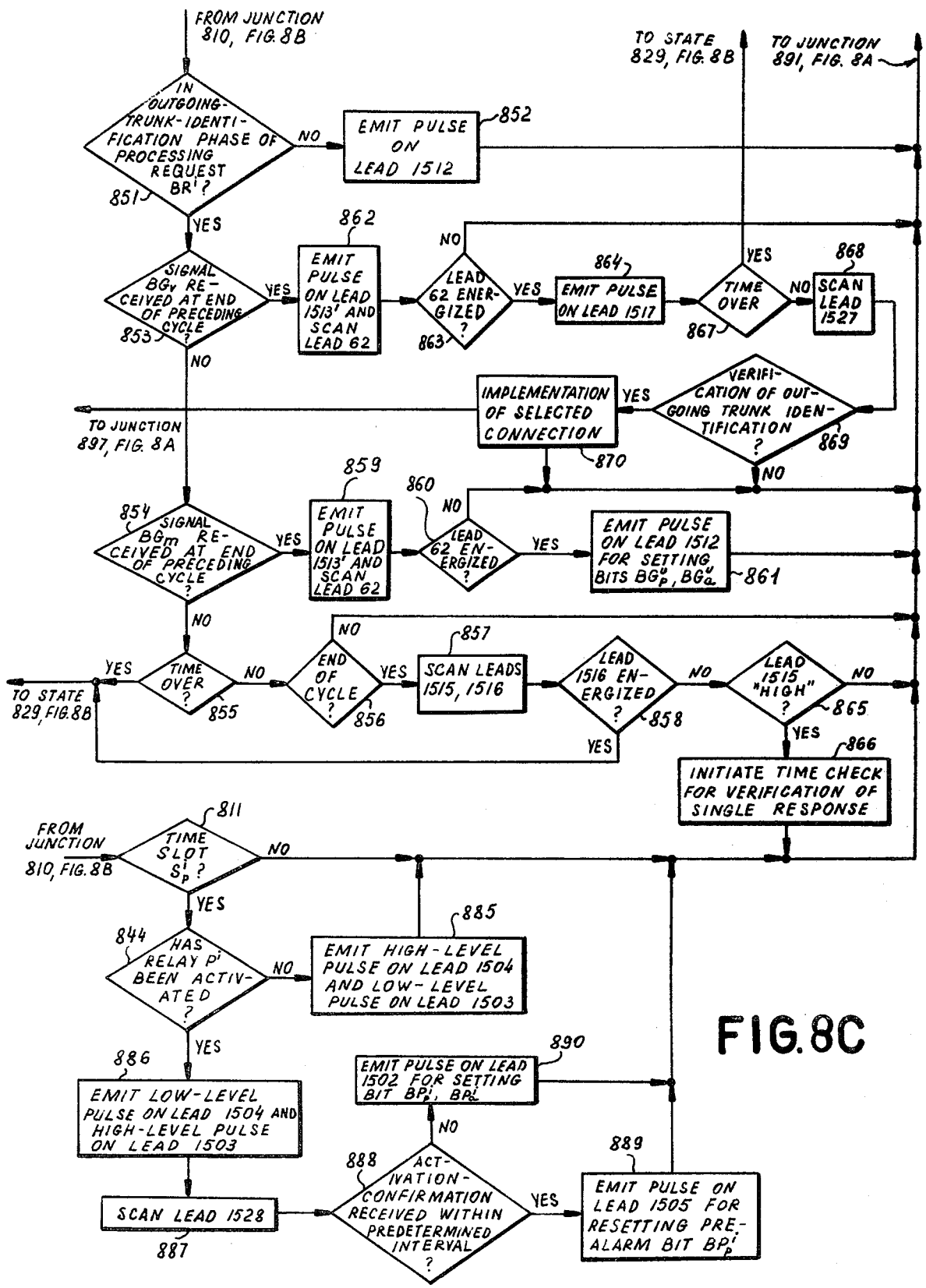

With reference to FIGS. 8A-8C, we shall now describe the operation of microprocessor MPI (FIGS. 3, 11) of a master controller ICA, ICB. Let us assume that identification controller ICA is master. Upon start-up of a line identifier according to our present invention, controller ICA initially generates in a step 801 voltage FS which is transmitted to testing unit PE (FIGS. 3 and 5) for indicating that microprocessor MPI of unit ICA is in service, i.e. that this unit is operational. Microprocessor MPI then energizes in a series of steps 802, 803, 804 a tern of leads 1600, 1509, 1511 to indicate that controller ICA is master, to reset circuit FICIC of unit ICA, and to enable the resetting of flip-flop $FF_{21}$ (FIG. 4C), respectively. The microprocessor MPI then enters a waiting state 805 in which it periodically consults a timer in an inquiry step 806 for determining whether a processing cycle is to begin.

Such a processing cycle is initiated with the de-energization (step 807) of lead 1509, whereby circuit FICIC (FIG. 4B) is enabled to be set by a "1"-level signal from microprocessor MPI on lead 1521, AND gate 223 is blocked from setting flip-flop $FF_{17}$ (FIG. 4B) in response to an energization of lead 106 by integrator IN, corresponding to the emission of an unsolicited activation confirmation BY, and NAND gate 228 is prevented from setting a bit $BG_d$ upon the occurrence on lead 107 of a pulse indicating a "0"-to-"1" changeover of a signal BG. Microprocessor MPI then undertakes an investigation of the identity of the current multiframe or processing time slot. Let us assume that there are L groups of sensors $N_p$, $N_r$, $N_y$ in sampling matrix CIC (FIGS. 1 and 2) and M groups of sensors $N_f$, $N_g$, $N_o$ in sampling matrix CIG. Let us further assume that the serializing and integrating units MSD, MX, IN of identifier ICA are adapted for emitting substantially simultaneously, on leads 107, 109 (FIG. 4C), pulses indicating a "0"-to-"1" changeover in a signal $BG^u$ and a signal $BF^u$ having a high logic level, where parameter u is an integer varying from one to M. Thus, a processing cycle will include 3L time slots $s_p^i$, $s_r^i$, $s_y^i$ ($i=1, 2 \ldots L$) respectively allotted to the sampling of signals $BP^i$, $BR^i$, $BY^i$ from cores $N_p^i$, $N_r^i$, $N_y^i$ and 2M slots $s_{fg}^u$ and $s_o^u$ respectively assigned to the processing of signals $BF^u$, $BG^u$ and $BO^u$ from cores $N_f^u$, $N_g^u$, and $N_o^u$. An investigation undertaken by microprocessor MPI to determine the identity of a time slot comprises a sequence of decision junctions 808, 809, 810, 811 at which the current time slot is determined to be assigned to the sampling of an identification request $BR^i$ (slot $s_r^i$), an activation confirmation $BY^i$ (slot $s_y^i$), an identification response $BG^u$ and an activation confirmation $BF^u$ (slot $s_{fg}u$), or an activation confirmation $BP^i$ (slot $s_p^i$). The processing of signals $BO^u$ from cores $N_o^u$ is performed by microprocessor MPG, as hereinafter described with reference to FIGS. 10A, 10B.

Upon discovering at junction 808 that the current time slot is assigned to the sampling of a request signal $BR^i$ from a core $N_r^i$, i.e. has an identity $s_r^i$, microprocessor MPG executes a scan 812 of lead 1500 which extends from flip-flop $FF_{18}$ (FIG. 4A) for carrying a bit $Rr^i$ signifying the existence of an acceptable request $BR^i$ from core $N_r^i$. If controller ICA is not already processing an identification request, as determined by the microprocessor MPI in an inquiry step 813, and if bit $Rr^i$ presents a high logic level, as checked at a junction 814, microprocessor MPI generates in a pair of consecutive steps 815, 816 pulses on leads 1521, 1501 for enabling the loading into register $R_1$ (FIG. 4B) of a time-base-produced address associated with cores $N_r^i$ and $N_y^i$ and for resetting acceptability bit $Rr^i$. Upon initiating in a step 817 a time check for the reception of request verification, microprocessor MPI enters a state 827 in which it awaits the next occurrence of slot $s_r^i$ in order to scan leads 1524, 1525 (step 821, FIG. 8B).

If inquiry 813 reveals that controller ICA is indeed processing an identification request and if two further inquiries 818, 819 establish that the extant request is from core $N_r^i$, microprocessor MPI consults at a junction 820 an internal register or a cell of memory RAM (see FIG. 11) to ascertain whether request verification is being awaited. Upon an affirmative outcome at junction 820, scan 821 of leads 1524, 1525 (FIG. 4B) is undertaken. As heretofore described, low- and high-level signals on leads 1524, 1525, respectively, indicate that control units ICA, ICB have received the same request $BR^i$ and that the request is acceptable, i.e. an alarm status coded by bits $BP_a$, $BY_a$ exists for neither relay $p^i$ nor relay $Y^i$. If verification occurs within a pre-established interval, as checked at a junction 822, microprocessor MPI acts in a sequence of steps 823, 824, 825 to activate relay $Y^i$, to energize lead 1506 (FIG. 4B) for enabling the processing of unsolicited confirmation signals BY, and to initiate a time check for the reception of activation confirmation $BY^i$. A state 826 then ensues in which unit MPI awaits relay-activation confirmation.

If inquiry 819 (FIG. 8A) discloses that an acceptable request $BR^i$ is no longer present, as indicated by a "0"-level potential on lead 1500, and if relay $Y^i$ has already been activated in step 823, as found at a decision junction 828 by microprocessor MPI, the latter executes a de-activation sequence 829–832 described in detail hereinafter.

Upon discovering at junction 809 that the current time slot has identity $s_y^i$, microprocessor decides at 833 whether a "1"-level signal $BY^i$ confirming the activation of relay $Y^i$ in step 823 is being awaited. A positive outcome at decision junction 833 results in a scan 834 of lead 1510, this lead being energized if signal $BY^i$ has a high logic level during time slot $s_y^i$. If at a subsequent decision junction 835 microprocessor MPI finds that an activation confirmation $BY^i$ is received within a pre-established interval, for which the time check was started in step 825, the microprocessor emits a pulse on lead 1507 (see FIG. 4B) to reset prealarm bit $BY_p^i$ in a step 836, informs twin controller ICB (step 837) via a lead 64 (see FIG. 3) of the arrival of the activation confirmation, and enters a waiting state 838 for the remaining time slots $s_y$ of the extant processing cycle. If, on the other hand, the microprocessor finds at 835 that the predetermined interval allocated to the reception of activation confirmation $BY^i$ has elapsed prior to the arrival of such confirmation, lead 1506' (FIG. 4B) is temporarily energized in a step 839 for making prealarm bit $BY_p^i$ high or, if that bit is already at its "1" level, doing the same to alarm bit $BY_a^i$. Unit MPI then enters into sequence 829–832 in which lead 1506 is de-energized (step 829) for terminating the automatic raising of the logical level of prealarm and alarm bits $BY_p$, $BY_a$ in response to activation signals BY, relay $Y^i$ is deactivated (step 830) via series-to-parallel interface CPC, a time check is initiated (step 831) for the reception of a "0"-level signal $BY^i$ confirming the deactivation of relay $Y^i$, and a waiting state 832 is begun for the release of the relay $Y^i$.

If, in a time slot $s_y^i$, microprocessor MPI finds at decision junctions 833, 840 that a deactivation-confirmation or low-level signal $BY^i$ is awaited, and if a scan 841 of lead 1510 yields no deactivation confirmation within a predetermined interval, the microprocessor MPI decides at a junction 842 to emit a pulse (step 843) on lead 1508 for setting alarm bit $BY_a^i$ regardless of the value of prealarm bit $BY_p^i$. The reception of a deactivation confirmation, i.e. a "0"-level signal on lead 1510 during time slot $s_y^i$, induces unit MPI to emit in a step 844 a pulse on lead 1507 for resetting flip-flop $FF_{16}$ (FIG. 4B).

Upon making negative decisions at junctions 833, 840, microprocessor MPI inquires at 845 whether an activation confirmation signal $BY^j$ is being awaited from a core $N_y^j$ different from core $N_y^i$. If the answer to inquiry 845 is "YES", unit MPI examines the voltage levels of leads 1526, 1526' in a scan 846 preceding a decision 847 relating to the existence of a "1"-level signal $BY^i$. If lead 1526 is energized, microprocessor MPI enters into sequence 829–832 for terminating the processing of the extant identification request $BR^j$ and for deactivating in step 830 both apparently malfunctioning relays $Y^i$, $Y^j$. The absence of unsolicited confirmation signals from cores $N_y$ and the reception of confirmation for the activation of a single relay Y, as determined at a junction 848 by microprocessor MPI in a final slot $s_y$ of a processing cycle, causes the microprocessor to initiate at 849 a time check for the arrival of a single signal $BG^u$ identifying the selected outgoing trunk. At this time, lead 1506 may also be de-energized to terminate the raising to a high level of prealarm and alarm bits $BY_p$, $BY_a$, by unsolicited confirmation signals. The microprocessor then enters a waiting state 850.

If, in a time slot $s_{fg}{}^u$ (junction 810), microprocessor MPI finds as a result of an inquiry 851 that it is not awaiting an identification response from a trunk circuit, a high-level pulse is emitted on lead 1512 (FIG. 4C) in a step 852 for making high a prealarm bit $BG_p{}^u$ or an associated alarm bit $BG_a{}^u$ under the condition that the inputs of gate 231 are energized, indicating a "0"-to-"1" changeover of a signal $BG^u$ from a core $N_g{}^u$ with a nondisabled trunk circuit. A positive response to inquiry 851 leads to a series of further inquiries 853–856 concerning the reception of signals $BG_v$, $BG_m$ at the end of the preceding cycle, the time elapsed since the initiation of the time check in step 849 and the progress of the extant processing cycle. Upon finding that a predetermined interval has passed without the detection of an identification response signal BG (negative outcomes at 853, 854 and a positive outcome at 855), microprocessor MPI enters into de-energization sequence 829–832, thereby terminating the identification process. If that predetermined interval is not yet over and if the current time slot $s_{fg}{}^u$ is the last in a subcycle relegated to the sampling of signals from cores $N_f$ and $N_g$, as decided by unit MPI at inquiries 855, 856, this unit undertakes a scan 857 of leads 1515, 1516 to determine whether one and only one core $N_g$ has responded to the activation of the relay Y in step 823. The energization of lead 1516, indicating multiple responses, results in the deactivation of the currently energized relay Y and the consequent termination of the identification processor, as decided at a junction 858.

Upon recalling at inquiry step 854 that signal $BG_m$ was received from logic network LTD (FIG. 4C) in the last time slot $s_{fg}$ of the preceding cycle, unit MPI emits in a step 859 a pulse on lead 1513' for enabling gate 244 to set address-comparison circuit FICIG upon the generation of a pulse by gate 243. The energization of lead 62 at the output of circuit FICIG, indicating the transmission of a "1"-level pulse $BG^u$ from core $N_g{}^u$, is discovered at a junction 860 and induces the same to emit at 861 a pulse on lead 1512 for making bit $BG_p{}^u$ or $BG_a{}^u$ high.

If signal $BG_v$ was received by microprocessor MPI at the last time slot $s_{fg}$ of the preceding cycle, as recalled by inquiry 853, the microprocessor temporarily energizes lead 1513' and scans leads 1514 and 62 (step 862). If lead 62 carries a high-level voltage, as found by unit MPI at a junction 863, a pulse is emitted on lead 1517 (step 864) for checking whether the identification response $BG^u$ has been verified by the other controller ICB. Prior to scanning lead 1527 (FIG. 4C) in a step 868, however, the microprocessor makes an inquiry 867 as to whether a time counting initiated in a step 866 in response to a decision at 865 is completed. If a preset interval has indeed elapsed, unit MPI proceeds to terminate the identification process by de-energizing in a sequence 829–832 the previously activated relay. Upon scanning lead 1527 at 868 and finding at an inquiry 869 a verification of the outgoing-trunk identification, an implementation phase 870 is entered.

Figure 9:
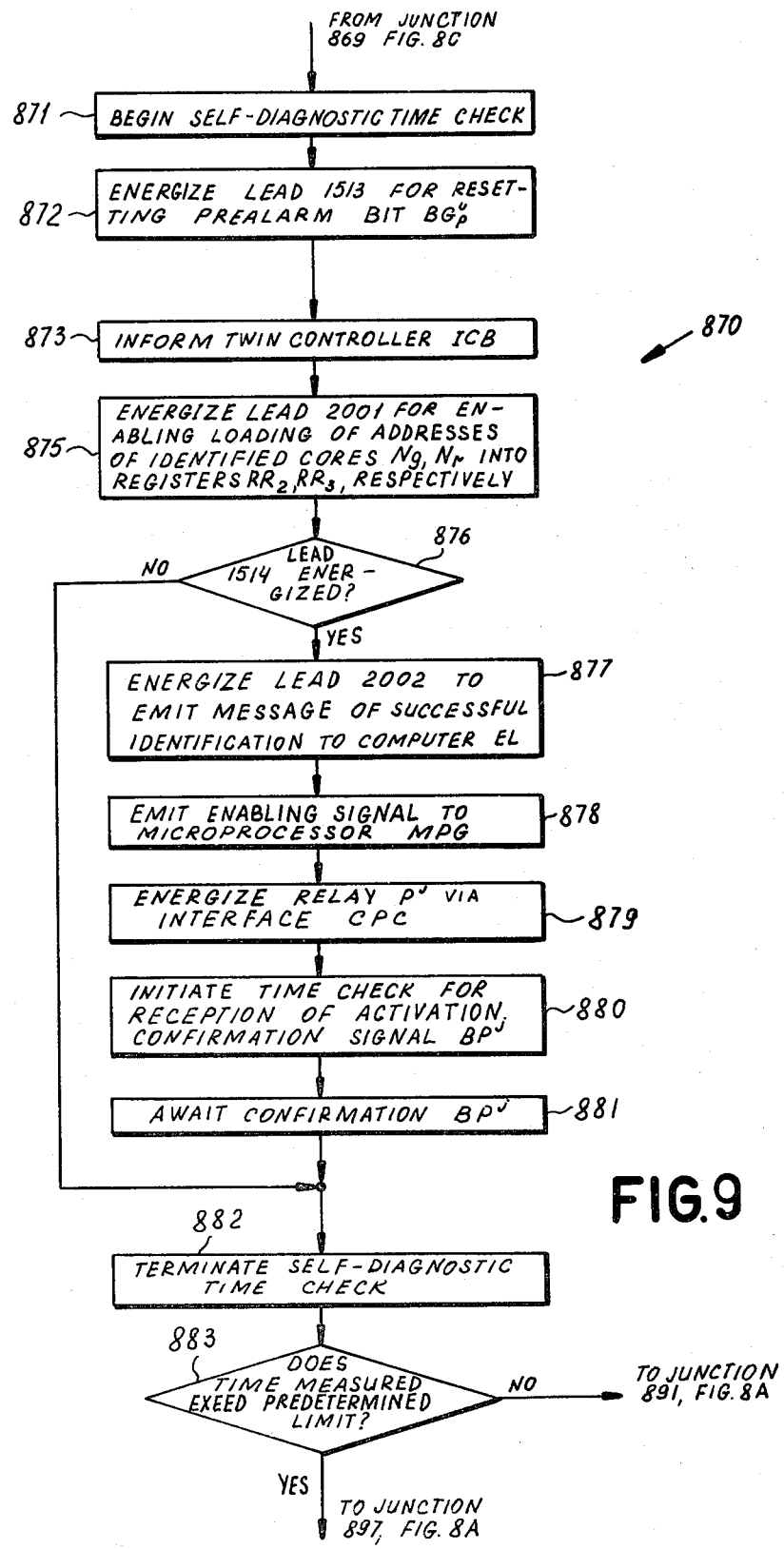
FIG. 9 is a flow-chart diagram illustrating in detail a step in FIG. 8C.

As shown in FIG. 9, implementation 870 begins with the initiation 871 of a self-diagnostic time check and the energization 872 of lead 1513 for making low the prealarm bit $BG_p{}^u$. The microprocessor of identifier ICA then dispatches a communication 873 to the subordinate identifier ICB for informing the same of a successful identification and emits a pulse on lead 2001 (FIG. 7) in a step 874 in order to enable the loading of addresses of identified cores $N_g{}^u$ and $N_f{}^j$ into registers $R_2$ and $R_3$, respectively. If lead 1514 is found at a junction 876 to be yet energized (lead 1514 was scanned previously in step 862), the connection implementation 870 continues with an emission 877 via lead 2002 of a message of successful identification to computer EL (see FIG. 1) and an emission 878 of an enabling signal to microprocessor MPG for inducing the energization of the appropriate relay $F^u$. Upon the subsequent activation 879 of relay $P^j$ via series-to-parallel interface CPC, unit MPI initiates at 880 a time counting for checking the reception of an activation-confirmation signal $BP^j$ from the core $N_p{}^j$ associated with relay $P^j$. As indicated in FIG. 9 at 881, microprocessor MPI then stores a plurality of predetermined bits coding the entrance of the identifier ICA into a waiting phase. If the time check begun in step 871 and stopped in a step 882 clocks an interval exceeding a pre-established maximum, as determined at a junction 883, the microprocessor of identifier ICA either transfers all control to twin ICB or energizes all relays P, F prior to going of service, as described hereinafter with reference to FIG. 8A.

A time check similar to that of FIG. 9 may be effected for states other than implementation state 870 to further monitor microprocessor function.

As shown in FIG. 8C, microprocessor MPI engages, upon finding at junction 811 that the current time slot has identity $s_p{}^i$, in an inquiry 884 as to the activation status of $P^i$. If the relay has not been activated, high- and low-level pulses are generated (step 885) on leads 1504, 1503, respectively, for letting bit $BP_p{}^i$ or $BP_a{}^i$ go to its high level. If, on the other hand, relay $P^i$ has been activated in step 879 (then i=j), leads 1503, 1504 are oppositely energized according to a step 886, whereby integrator IN (FIG. 3) is disabled from setting flip-flops $FF_{19}$, $FF_{20}$ (FIG. 4A) via AND gate 209. Upon the transmission of a "0"-level pulse on lead 1504 and a "1"-level pulse on lead 1503, unit MPI executes a scan 887 of a lead 1528 which extends from an AND gate 209' having input leads 1503 and 104 (see FIG. 4A). The energization of lead 1528 detected by microprocessor MPI within a pre-established interval (junction 888) corresponds to a timely activation confirmation $BP^i$ and causes the emission 889 of a high-level pulse on lead 1505 for resetting prealarm bit $BP_p{}^i$. An untimely or nonexistent activation confirmation $BP^i$ induces microprocessor MPI to emit in a step 890 a pulse on lead 1502 for setting prealarm bit $BP_p{}^i$ or alarm bit $BP_a{}^i$.

As shown in FIG. 8A, upon completing the processing operations pertinent to a time slot $s_x{}^i$, $s_y{}^i$, $s_{fg}{}^u$, or $s_p{}^i$, microprocessor MPI inquires at 891 into the progress of the current identification cycle. The discovery at 891 of an unfinished cycles leads to the re-entry of the microprocessor into inquiry sequence 808–811, while an affirmative reply to inquiry 891 leads to a step 892 in which lead 1511 (FIG. 4C) is de-energized and to a subsequent decision junction 893 concerning the status of the current identification process. If the current identification was not completed in the last processing cycle, unit MPI continues to function as master, immediately performing waiting-state steps 803–806, but if an identification was just successfully implemented, unit MPI checks at 894 as to the presence of a twin controller ICB.

Upon finding at check 894 that twin controller ICB is either nonexistent or out of service, microprocessor MPI engages in a series of self-diagnostic tests 895, a positive testing outcome decided at a junction 896 causing identifier ICA to continue at 803 as master, a negative testing outcome leading via a double check 897 to an activation 898 of all relays F, P, a de-energization of lead 1600 and a cessation of voltage FS (step 899) and finally to an out-of-service state 900. As heretofore described with reference to FIG. 9, microprocessor MPI may also execute steps 898, 899 and put itself out of service upon finding at junction 883 that the time check of steps 871 and 882 exceeds a predetermined maximum duration and upon a negative check 897 on the functional status of twin identifier ICB. If the check at 897 turns out to be positive, identifier ICA transfers in a step 901 all memory contents and control to twin ICB before de-energizing lead 1600 and blocking the generation of voltage FS (step 899).

Upon the discovery at check 894 of an operational twin controller ICB, microprocessor MPI emits in a step 902 an availability signal to twin ICB and awaits the result of a relay check conducted thereby. If a signal BOKTEN indicating a positive relay check does not arrive from controller ICB within a pre-established interval (decided at a junction 903) or, upon the arrival of signal BOKTEN, if a check 904 on lead 1601' (FIG. 5) reveals the presence of signal APX indicating the operation of device PE of controller ICA, diagnostic tests 895 are executed. Upon receiving a timely check signal BOKTEN and noting the absence of signal APX, the microprocessor MPI transfers at 905 memory contents and control functions to twin identifier ICB, de-energizes lead 1600 (FIG. 5) and enters an idle state 907 (FIG. 8D) which includes a periodic time check 907'.

As shown in FIGS. 8D, 8E, upon determining at check 907' that it is time for a processing cycle to begin, microprocessor MPI of identifier ICA, now operating in a subordinate role to verify the signals detected by master ICB, enters a series of junctions 908–910 for deciding the identity $s_{r^i}$, $s_{y^i}$ or $s_{fg^u}$ of a current time slot. If, upon finding at decision junction 908 that the current time slot has identity $s_{r^i}$, microprocessor MPI recalls via an inquiry 911 that previous scans of multiple 22 (FIG. 3) have not communicated the reception of an identification request by master controller ICB, microprocessor MPI undertakes another scan 912 of this multiple. The presence on multiple 22 of a command to verify an identification request $BR^i$, determined by unit MPI at a junction 913, initiates a time count 914 for implementation of the verification.

The recollection at 911 of a verification command, and the discovery upon a pair of further inquiries 915, 916 that the extant request has not yet been verified and that the time count begun in step 914 is not terminated, induces microprocessor MPI to scan (step 917) leads 1524 and 1525. If leads 1524, 1525 carry "0"-level and "1"-level potentials, respectively, unit MPI decides at junction 918 to institute a time check 919 for receiving from master controller ICB a command to verify activation confirmation $BY^i$; unit MPI then awaits (step 920) the verification command. It is to be noted that the nondetection of verification signals "0", "1" on leads 1524, 1525 means that either the extant verification request has identity $BR^j$ (j=i), in which case both leads 1524, 1525 carry voltages of low logic level, or the request $BR^i$ received by master ICB has not yet been detected by identifier or controller ICA, in which case lead 1524 is energized.

If an identification request is not verified by subordinate controller ICA within a pre-established time interval, as determined by microprocessor MPI upon inquiries 915, 916, this microprocessor emits in a step 921 an availability signal to master controller ICB and institutes a time check 922 for reception of a corresponding availability signal from the microprocessor of the master controller. If the master is not available within a pre-established interval, as checked by subordinate microprocessor MPI at 923, subordinate ICA returns to the idle state 907, 907'. However, the timely arrival of an availability signal from the master ICB and the absence of a signal BPX generated by the testing unit PE of the master ICB for indicating that this unit is engaged in testing relays F, discovered by microprocessor MPI of subordinate ICA at a junction 924, leads to a check 925 by unit MPI of its ability to activate relays F, P, Y for sustained intervals. If at least one of the relays F, P, Y does not hold effectively, as determined at an inquiry 926, identifier ICA enters an out-of-service state 927. If the relays do hold sufficiently, microprocessor MPI emits at 928 a signal AOKTEN to twin ICB, whereupon memory contents and control are transferred at 929 from twin ICB and lead 1600 is energized in step 802 (FIG. 8A) by controller ICA to indicate that it is now the master.

Upon finding at inquiry 915 in time slot $s_{r^i}$ that master ICB is processing a verified identification request, microprocessor MPI of controller ICA undertakes a scan 929 of leads 1524, 1525 in order to check at 931 the synchronization of the operations of microprocessors MPI of identifiers ICA, ICB. A high-level potential on lead 1524 induces the subordinate microprocessor to return to idle state 907, 907', while a low-level potential indicating synchronization initiates an inquiry 932 into the progress of the current processing cycle. Microprocessor MPI reinvestigates in series 908–910 the identity of the current time slot, if the processing cycle is not yet over, and returns to the idle state, if the cycle is finished and if a current identification has not yet been completed, as checked at a decision junction 933. Upon the successful implementation of an identification, controller ICA emits to twin ICB an availability signal (step 921).

The processing of a verified identification request, as determined at a check 934, causes in time slot $s_{y^i}$ a scan 935 (FIG. 8E) of leads 1524, 1525 (FIG. 4B) of logic network LTD of the subordinate identifier ICA by the microprocessor ICA thereof for monitoring the synchronization of microprogram operations in the twin identifiers ICA, ICB. On the one hand, if operations are found at a junction 936 to be desynchronized, as heretofore described with reference to check 931 shown in FIG. 8D, controller ICA re-enters the idle state 907, 907'. On the other hand, if synchronization is discovered at junction 936, microprocessor MPI checks at 937 whether it is awaiting a command for verification of a relay-activation confirmation $BY^i$ (see step 920, FIG. 8D). Let us first assume that unit MPI of the subordinate controller ICA is awaiting a command for verifying confirmation $BY^i$. If a preset interval for receiving such command expires, as determined at a junction 938, unit MPI enters into state sequence 921–928 for implementing a control-role exchange with twin ICB; however, if the preset interval clocked from initiation step 919 has not yet expired, microprocessor MPI scans multiple 22 (step 939) for checking at 940 whether a verification command has arrived since a previous check. An answer "NO" to check inquiry 940 reinstates the subordinate microprocessor at 907, 907', while an answer "YES" begins a time count 941 for a positive verification of confirmation signal $BY^i$ and a waiting state 942.

Let us now assume that unit MPI of the subordinate controller ICA is not awaiting a command for verification of signal $BY^i$. Thus, after receiving a negative response to check 937, unit MPI inquires at 943 whether it has in fact already received a verification command and is awaiting verification of confirmation $BY^i$. Upon an affirmative response to inquiry 943 and to a subsequent inquiry 944 into the time remaining in the check begun in step 941, microprocessor MPI of controller ICA enters state 921 for initiating a role-exchange attempt with twin ICB. If the pre-established interval for awaiting confirmation verification has not yet terminated, microprocessor MPI scans lead 1510 (FIG. 4B) of the associated logic network LTD in a step 945. The energization of lead 1510 indicating verification institutes another time check 947 for verification of a single response BG, identifier ICA then awaiting (step 948) such verification. If lead 1510 is found at a junction 946 to be de-energized, unit MPI returns either to the idle state 907, 907' or to junction series 908–910, depending on the progress of the current processing cycle and the current identification.

If in time slot $s_y^i$ microprocessor MPI of identifier ICA discovers in consecutive inquiries 943 and 949 that it is not awaiting a confirmation signal $BY^i$ or $BY^j$ ($j \neq i$), the microprocessor MPI again arrives at junction 932 (FIG. 8D). However, if verification is being awaited of a confirmation signal $BY^j$ assigned to a time slot $s_y^j$ other than the current one $s_y^i$, a scan 950 of leads 1526, 1526' is executed for detecting unsolicited confirmation signal $BY^j$. The detection at a junction 951 of a signal $BY^j$ induces the microprocessor MPI to enter sequence 921–928, thereby terminating the subordinate function in a current identification operation.

Upon determining at junction 910 that the current time slot has identity $s_{fg}^u$, unit MPI of the subordinate controller decides at 952 whether master ICB is processing a verified identification request and, in the event of a positive decision at 952, performs a scan 953 of leads 1524, 1525. The de-energization of lead 1524, indicating synchronization of identifiers ICA, ICB, and the waiting of subordinate ICA in state 948, as determined at junctions 954, 955, leads to an investigation 956 of the time left in the check initiated in step 947.

If a preset interval has elapsed without the verification of a single response BG, the subordinate identifier prepares via steps 921–928 to assume the functions of the master, while if such preset interval has not yet passed, lead 1527 is scanned (step 957). A high-level pulse on lead 1527 (FIG. 4C) signifies a successful identification, whereupon the subordinate ICA may exchange roles with the master ICB; a low-level pulse on lead 1527 means that a decision must be taken at a junction 958 to continue with the identification process in the next multiframe or cycle.

Upon start-up of our line identifier, as shown in FIG. 10A, microprocessor MPG (FIG. 3) of the master ICA or ICB enters a waiting state 701 in which time-base signal TSG (FIG. 5) is periodically checked at a decision junction 701' to determine whether trunk-related signals BG are being processed. Upon a "YES" decision at 701' and a recognition at 702 of the identity $s_{fg}^u$ of the current time slot, microprocessor MPG inquires at 703 and 704 into the testing status and the operational status, respectively, of relay $F^u$. If relay $F^u$ is neither under test nor activated ($BF^u = $"0"), unit MPG determines at a subsequent junction 705 whether it is awaiting activation-confirmation signal $BF^u$ from relay $F^u$. The failure of an expected activation confirmation $F^u$ to arrive within a predetermined interval, as checked in an inquiry 706, induces the microprocessor MPG to emit in a step 707 a pulse on lead 141 (FIG. 4C) for driving either prealarm bit $BF_p^u$ or alarm bit $BP_a^u$ to its high value. However, if a time count begun in a step 714 for measuring this predetermined interval is not yet over, microprocessor MPG returns to steps 701, 701', 702 to await a subsequent trunk-allocated time slot $s_{fg}^{u+1}$.

Upon recollecting at junctions 705, 708 that it is awaiting neither an activation nor a deactivation confirmation, microprocessor MPG executes a scan 709 of multiple 22 (FIG. 3) for detecting in an inquiry 710 a command from microprocessor MPI to energize relay $F^u$. Such a command, in addition to a positive check 711 on the nonalarm status ($BF_a^u = $"0") of relay $F^u$, leads to an activation 712 of relay $F^u$, an initiation 713 of a recurrent energization of lead 140 (FIG. 4C) during subsequent recurrences of slot $s_{fg}^u$, and an institution 714 of a time count for checking relay activation. Microprocessor MPG then awaits at 715 confirmation signal $BF^u$.

A negative finding at inquiry 704, indicating that relay $F^u$ is not in an operated state, and a positive decision at junction 708 cause the emission 716 of a pulse on lead 142 (FIG. 4C) for returning the prealarm bit $BF_p^u$ to its low level and the termination 717 of the recurrent de-energization of lead 140 initiated in step 713, microprocessor MPG then scanning (at 709) the multiple 22 for a relay-activation command from unit MPI.

Upon discovering in time slot $s_{fg}^u$ that relay $F^u$ is not under test (inquiry 703) and is activated ($BF^u = $"1"), unit MPG checks at 718 whether it is awaiting release confirmation from core $N_f^u$. If check 718 has a "YES" result and if a pre-established interval for awaiting release has elapsed, as determined at a decision junction 719, a pulse is emitted in a step 720 on lead 141 for updating the alarm status of relay $F^u$. If an activation confirmation rather than a release confirmation is being expected, as recalled at a junction 721, unit MPG emits at 722 a pulse on lead 142. If microprocessor MPG is not awaiting any confirmation from core $N_f^u$, but finds upon a scan 723 of multiple 22 a command to energize the already activated relay $F^u$, a decision is made at a junction 724 to emit a pulse on lead 142 (step 720).

In the absence of confirmation expectations and energization commands related to an energized relay $F^u$, decided at 718, 721 and 724, and upon the discovery at a junction 725 of a "1"-to-"0" changeover in signal $BO^u$ indicating a trunk disconnection monitored by core $N_o^u$ (see FIG. 2), microprocessor MPG enters into a relay-deactivation sequence 727–729, provided that a check 726 reveals that alarm bit $BF_a^u$ is low. Sequence 727–729 includes the release of relay $F^u$, the institution 728 of a time count for the arrival of a deactivation-confirmation signal, and a waiting state 729. If there is no voltage changeover from core $N_o^u$ indicative of a trunk disconnection, microprocessor MPG consults at 730 a predetermined memory cell for an order $E^u$ from computer EL for the release of relay $F^u$. Such an order $E^u$ must be accompanied by a confirmation $D^u$ within a predetermined interval, as checked by microprocessor MPG at 731, if the release order is to be implemented in sequence 727–729. Upon the timely detection of confirmation $D^u$, unit MPG makes bits $E^u$, $D^u$ low in a step 732 prior to check 726 and sequence 727–729. The failure of a timely confirmation $D^u$ returns 733 bit $E^u$ to "0" and has no effect upon relay $F^u$.

If inquiry 710 yields no command to activate relay $F^u$, unit MPI de-energizes lead 160 in a step 734 (FIG. 10B) for enabling the setting of flip-flop $FF_{13}$ via NAND gate 258' (FIG. 5). An appearance of high-level potentials on leads 164, 165, indicating a request for the testing of relay F, induces microprocessor MPG at a junction 735 to enter upon a testing sequence including initial steps 736–740, whereas a "0"-level potential on lead 164 leads to the re-energization 741 of lead 160. Steps 736–740 involve the activation (at 736) of relay $F^u$, an initiation (at 737) of recurrent de-energization of lead 140 during time slot $s_{fg}{}^u$, a de-energization (at 738) of lead 163 for temporarily blocking incrementation of the contents of counter CTR (FIG. 5), and the beginning of a time check (at 739) for the reception of activation confirmation. At 740 the microprocessor MPG enters a state for awaiting confirmation of the test activation 736.

Figure 10B:
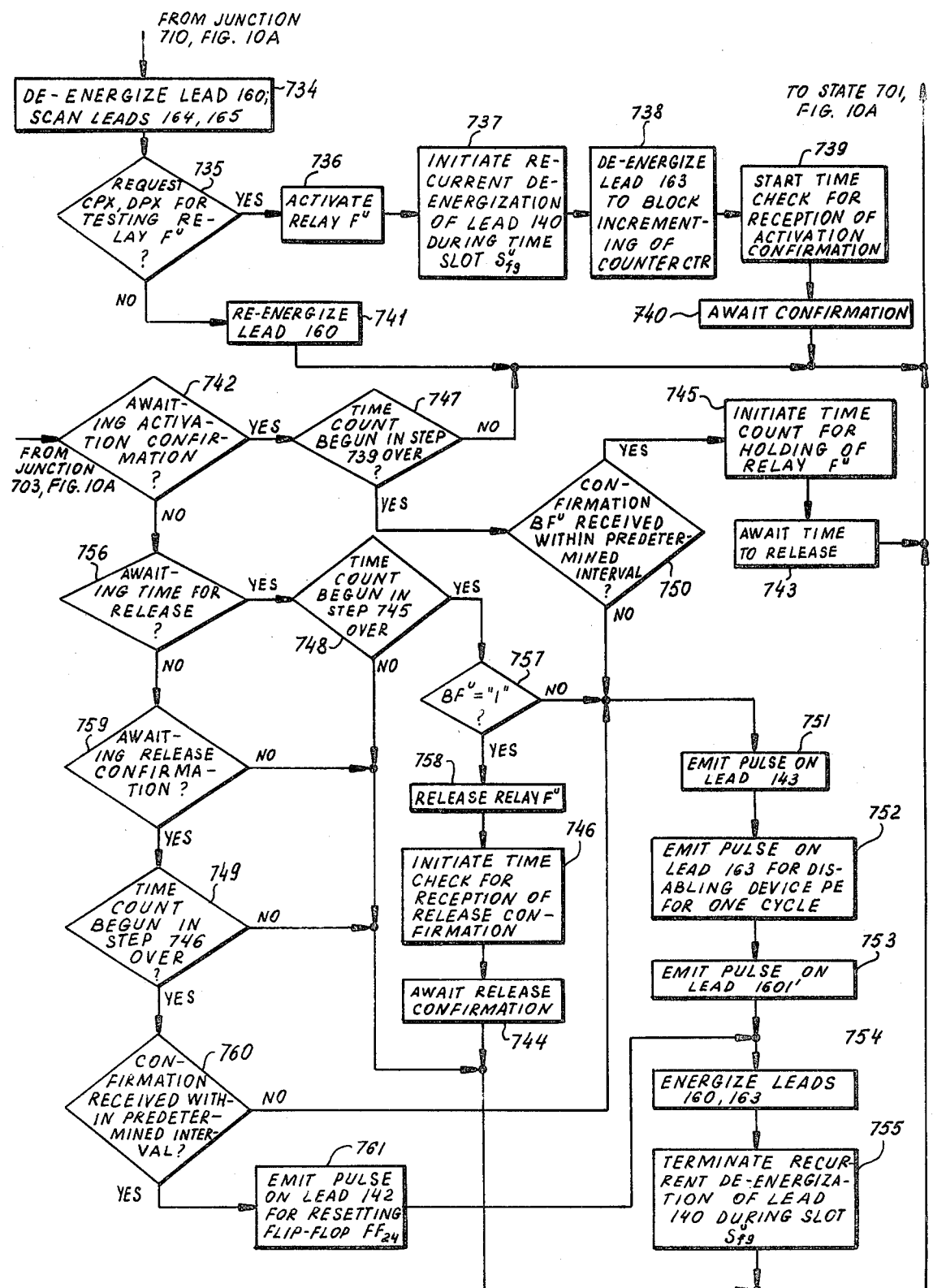

As shown in FIG. 10B, the testing of relay $F^u$, affirmed or recalled at inquiry 703, comprises three consecutive waiting states 740, 734, 744 corresponding to the testing or relay activation, holding and deactivation, respectively. Each state 740, 734, 744 is begun with the initiation 739, 745, 746 of a respective time count whose progress is recurrently compared with a corresponding pre-established interval at a respective decision junction 747, 748, 749. Upon finding at 703 (FIG. 10A) that relay $F^u$ is presently under test and at an inquiry 742 that waiting state 740 is extant, microprocessor MPG engages in the time comparison at junction 747. If the pre-established interval assigned to the testing of relay activation has not yet been measured, unit MPG returns to steps 701, 701', whereas if the time count begun in step 739 is over, a check 750 is undertaken to determine whether the expected activation confirmation was received within this interval. The timely reception of activation confirmation leads to initiation 745 and waiting state 743; a nonarrival induces the microprocessor MPI to abort the testing sequence and to produce a pulse on lead 143 in a step 751 for making high the alarm bit $BF_a{}^u$. In response to the "1" level of this bit, a pulse is emitted on lead 163 in a step 752 for disabling device PE (FIG. 5) for one processing cycle and another pulse is generated on lead 161' for resetting flip-flop $FF_{12}$ in preparation for the next relay test by device PE and unit MPG. Two final steps 754, 755 in the testing procedure energize leads 160, 163 for blocking the setting of flip-flop $FF_{13}$ until a relay identified by the contents of counter CTR is available for testing and for enabling the stepping of this counter and terminate the recurrent de-energization of lead 140 during slot $s_{fg}{}^u$ begun in step 737.

If inquiries 742, 756 yield that microprocessor MPG is in waiting state 743 and if the comparison at junction 748 is positive, i.e. if the time counted since step 745 is equal to a pre-established interval, the microprocessor MPG checks at 757 whether the relay is still holding. The detection of a holding failure leads to abort sequence 751–755, while successful holding induces a relay release 758, step 746 and waiting state 744.

Negative outcomes to inquiries 742, 756 and a positive outcome to a subsequent inquiry 759, indicating that the microprocessor MPG is in waiting state 744, introduces the comparison at junction 749 of the time count of step 746 with a preset interval. If such interval has elapsed and if confirmation was not received, as checked at 760, a pulse is emitted on lead 142 in a step 761 for making prealarm bit $BF_p{}^u$ low, the microprocessor then implementing steps 754, 755. The failure of an expected deactivation confirmation to arrive within the preset interval induces unit MPG to enter abort sequence 751–755.

It is to be noted that plug connections $1a'$, $1b'$, $1c$ (FIG. 2) may form respective conductors of a switchboard semicord or patchcord.

We claim:

1. In a telecommunications system including a switchboard with multiplicity of incoming lines and a multiplicity of outgoing lines,
   the combination therewith of a line identifier for monitoring switchboard activity and for establishing a communication link between a selected incoming line and a selected outgoing line in response to manual operations at said switchboard, said line identifier comprising:
   first detector means connected to said switchboard for generating a signal coding the identity of a selected incoming line and for requesting the identification of a concomitantly selected outgoing line;
   second detector means connected to said switchboard for generating a signal coding the identity of a selected outgoing line;
   switching means coupled to said lines for connecting a selected incoming line to a concomitantly selected outgoing line upon the successful recognition thereof by said line identifier; and
   control means operationally linked to said first detector means for decoding identification-request signals therefrom, to said second detector means for enabling same to emit a trunk-identifying signal upon the reception by said control means of a request signal from said first detector means, and to said switching means for activating same to connect a selected incoming line to a concomitantly selected outgoing line upon the decoding by said control means of a signal from said second detector means indicating such outgoing line.

2. The combination defined in claim 1 wherein said first detector means includes a matrix of current sensors each operationally coupled with a respective first circuit portion in turn associated with a respective incoming line, said sensors being connected to said control means for communicating identification requests thereto, said first detector means further including a multiplicity of second circuit portions associated with respective outgoing lines, a first circuit portion associated with a selected incoming line forming a closed circuit, upon the execution of a loop-closing operation at said switchboard, with a second circuit portion associated with a concomitantly selected outgoing line, thereby energizing a corresponding sensor of said matrix to emit an identification-request signal to said control means.

3. The combination defined in claim 2 wherein said second detector means includes another matrix of additional current sensors each operationally coupled with a respective third circuit portion in turn associated with a respective outgoing line, said additional sensors being connected to said control means for communicating thereto the identity of a selected outgoing line, said second detector means further including a multiplicity of fourth circuit portions associated with respective incoming lines, said second detector means further including in each fourth circuit portion a normally open switch closable by said control means, a third circuit portion associated with a selected outgoing line forming a closed circuit, upon the execution of a loop-closing operation at said switchboard and upon the closing of a switch in a fourth circuit portion associated with a selected incoming line, with such fourth circuit portion associated therewith, thereby energizing a corresponding additional sensor to emit to said control means a signal identifying the selected outgoing line.

4. The combination defined in claim 3 wherein said switching means includes double-ple double-throw switches connected to said circuit portions and to said incoming lines and said outgoing lines for forming a communication link between a selected incoming line and a selected outgoing line upon breaking a first connection formed between a first circuit portion and a second circuit portion for identifying the selected incoming line and a second connection formed between a third circuit portion and a fourth circuit portion for identifying the selected outgoing line.

5. The combination defined in claim 4 wherein said sensors have separate connections extending to said control means, said control means including serializing means for converting parallel signals from said sensors into a time-division multiframe, whereby incoming-line identity and outgoing-line identity are coded by temporal position in said multiframe, said switching means including relays for actuating respective switches, said control means further including a series-parallel interface having output connections extending to respective relays of said switching means for selectively operating same upon successful processing of an identification request.

6. The combination defined in claim 5, further comprising sensors operationally coupled to respective relays and to said control means for emitting thereto confirmation signals indicating the actuation status of said relays.

7. The combination defined in claim 6 wherein said control means further includes a memory for storing alarm bits coding the failure status of said relays and a logic network communicating with said memory and having input connections from said serializing means for updating said alarm bits at least partially in response to said confirmation signals.

8. The combination defined in claim 7 wherein said logic network has flip-flop means connected to said serializing means for detecting and registering the occurrence of a plurality of outgoing-line-identifying signals from said second detector means upon an enabling thereof in response to an acceptable request from said first detector means, said control means further including microprocessing means connected to said flip-flop means and to said interface for selectively activating said relays upon the detection of a single outgoing-line-identifying signal concomitant with an identification request.

9. The combination defined in claim 8 wherein said logic network has additional flip-flop means connected to said memory and to said serializing means for establishing the acceptability of an identification request at least partially in relation to the failure status of relays associated with the requesting sensor, said microprocessing means being connected to said additional flip-flop means for selectively closing via said interface the switches in said fourth circuit portions to enable said second detector means in response to an acceptable request from said first detector means.

10. The combination defined in claim 8 or 9 wherein said microprocessing means includes a first microprocessor for selectively activating relays associated with said incoming lines and a second microprocessor for selectively activating relays associated with said outgoing lines.

11. The combination defined in claim 10 wherein said control means includes a device connected to said second microprocessor for cooperating therewith to test the action of the relays associated with said outgoing lines.

12. The combination defined in claim 5 wherein said control means includes a multiplexer downstream of said serializing means for inserting testing bits into said multiframe.

13. The combination defined in claim 3 wherein said first circuit portions and said fourth circuit portions are connected to a source of relatively low voltage and said second circuit portions and said third circuit portions are connected to a source of relatively high voltage.

14. The combination defined in claim 2 wherein said control means includes an integrator for recognizing real state transitions in the outputs of said sensors.

15. The combination defined in claim 1 wherein said control means includes a pair of structurally identical controllers functioning in a master-subordinate relationship reversible upon completion of an identification process, said controllers being interconnected to enable a subordinate controller to perform checks on signals received by the other controllers.

16. The combination defined in claim 1 wherein said control means includes a message former connectable to a computer for informing same of the identities of a selected incoming line and a concomitantly selected outgoing line upon successful completion of an identification process.

17. The combination defined in claim 1, further comprising checking means monitoring the operation of said switching means.

* * * * *